(12) United States Patent
Soler et al.

(10) Patent No.: US 11,536,373 B2
(45) Date of Patent: Dec. 27, 2022

(54) SEAL ASSEMBLIES AND RELATED METHODS

(71) Applicant: Bal Seal Engineering, LLC, Foothill Ranch, CA (US)

(72) Inventors: Lluis Soler, Foothill Ranch, CA (US); Derek Changsrivong, Foothill Ranch, CA (US); Peter J Balsells, Newport Beach, CA (US); Stephen Rust, Lake Forest, CA (US); Mike Foster, Foothill Ranch, CA (US); Tony Quach, Fullerton, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 662 days.

(21) Appl. No.: 15/451,732

(22) Filed: Mar. 7, 2017

(65) Prior Publication Data
US 2017/0261108 A1  Sep. 14, 2017

Related U.S. Application Data

(60) Provisional application No. 62/304,883, filed on Mar. 7, 2016.

(51) Int. Cl.
*F16J 15/34* (2006.01)
*F16J 15/3212* (2016.01)
(Continued)

(52) U.S. Cl.
CPC ........... *F16J 15/3452* (2013.01); *F16F 1/045* (2013.01); *F16J 15/3208* (2013.01); *F16J 15/3212* (2013.01); *F16J 15/3236* (2013.01)

(58) Field of Classification Search
CPC .. F16J 15/3452; F16J 15/3212; F16J 15/3208; F16J 15/3236
See application file for complete search history.

(56) References Cited

U.S. PATENT DOCUMENTS 2,208,482 A * 7/1940 Victor .................. F16J 15/3248
277/569
2,525,730 A * 10/1950 Schulze ................ F16F 15/067
267/170

(Continued)

FOREIGN PATENT DOCUMENTS

EP  0922891 A2  6/1999
EP  2233799 A1  9/2010

(Continued)

OTHER PUBLICATIONS

Extended European Search Report from European Patent Office on related EP application (EP17159551.5) dated Jul. 11, 2017.

(Continued)

*Primary Examiner* — Christine M Mills
*Assistant Examiner* — L. Susmitha Koneru
(74) *Attorney, Agent, or Firm* — KOS IP Law LLP

(57) ABSTRACT

Spring energized seal assemblies each with one or two sealing elements and a canted coil spring located in a spring cavity of the sealing element or of the two sealing elements to bias an inner flange and an outer flange of the respective spring cavity away from one another. The canted coil springs can have un-conventional coil shapes with one or more straight coil segments and/or with curved connecting ends. The coils can have dimples to provide multiple biasing points. The coils can have loops. The canted coil springs with un-conventional coil shapes can be used to improve spring loading on a sealing element.

21 Claims, 11 Drawing Sheets

(51) Int. Cl.
*F16J 15/3208* (2016.01)
*F16J 15/3236* (2016.01)
*F16F 1/04* (2006.01)

(56) References Cited

U.S. PATENT DOCUMENTS

| | | | |
|---|---|---|---|
| 4,655,462 A * | 4/1987 | Balsells | F16J 15/3212 267/1.5 |
| 4,655,945 A | 4/1987 | Balsells | |
| 4,804,290 A | 2/1989 | Balsells | |
| 4,805,943 A | 2/1989 | Balsells | |
| 5,072,070 A | 12/1991 | Balsells | |
| 5,079,388 A | 1/1992 | Balsells | |
| 5,091,606 A | 2/1992 | Balsells | |
| 5,117,066 A | 5/1992 | Balsells | |
| 5,134,244 A | 7/1992 | Balsells | |
| 5,161,806 A | 11/1992 | Balsells | |
| 5,265,890 A | 11/1993 | Balsells | |
| 5,358,224 A | 10/1994 | Balsells | |
| 5,474,309 A * | 12/1995 | Balsells | H05K 9/0016 277/651 |
| 5,542,682 A * | 8/1996 | Goldstein | F16J 15/3212 267/1.5 |
| 5,575,487 A | 11/1996 | Balsells | |
| 5,599,027 A | 2/1997 | Balsells | |
| 5,979,904 A * | 11/1999 | Balsells | F16J 15/3236 277/554 |
| 5,984,316 A | 11/1999 | Balsells | |
| 5,992,856 A | 11/1999 | Basells et al. | |
| 6,050,572 A | 4/2000 | Balsells et al. | |
| 6,161,838 A | 12/2000 | Balsells | |
| 6,264,205 B1 | 7/2001 | Balsells | |
| 6,641,141 B2 | 11/2003 | Schroeder | |
| 7,055,812 B2 * | 6/2006 | Balsells | F16F 1/045 267/166 |
| 7,210,398 B2 | 5/2007 | Balsells | |
| 7,464,750 B2 | 12/2008 | Schapel et al. | |
| 8,096,559 B2 | 1/2012 | Cook | |
| 8,328,202 B2 | 12/2012 | Foster et al. | |
| 8,544,850 B2 | 10/2013 | Balsells et al. | |
| 8,684,362 B2 | 4/2014 | Balsells et al. | |
| 9,194,497 B2 | 11/2015 | Rastegar | |
| 9,234,591 B2 | 1/2016 | Dilmaghanian et al. | |
| 9,285,034 B2 | 3/2016 | Balsells et al. | |
| 9,357,684 B2 | 5/2016 | Foster | |
| 2005/0242525 A1 * | 11/2005 | Dahlke | F16J 15/028 277/605 |
| 2010/0237565 A1 | 9/2010 | Foster | |
| 2011/0006486 A1 | 1/2011 | Niknezhad | |
| 2012/0098179 A1 * | 4/2012 | Jaster | F16F 1/045 267/166 |
| 2013/0043660 A1 * | 2/2013 | Daub | F16J 15/3212 277/500 |
| 2013/0043661 A1 | 2/2013 | Binder et al. | |
| 2014/0131932 A1 | 5/2014 | Balsells et al. | |
| 2014/0219713 A1 * | 8/2014 | Balsells | F16B 21/186 403/327 |
| 2014/0312570 A1 | 10/2014 | Foster | |
| 2016/0047473 A1 * | 2/2016 | Foster | F16F 1/045 277/309 |
| 2016/0076568 A1 * | 3/2016 | Dilmaghanian | H01R 13/514 403/271 |
| 2016/0223086 A1 | 8/2016 | Balsells et al. | |
| 2017/0172018 A1 | 6/2017 | Dilmaghanian et al. | |
| 2017/0261108 A1 | 9/2017 | Soler et al. | |
| 2017/0328474 A1 | 11/2017 | Balsells | |
| 2018/0112778 A1 | 4/2018 | Dilmaghanian et al. | |
| 2018/0119857 A1 | 5/2018 | Balsells | |
| 2018/0266562 A1 | 9/2018 | Balsells | |

FOREIGN PATENT DOCUMENTS

| | | |
|---|---|---|
| EP | 2921737 A2 | 9/2015 |
| WO | WO 2014/117093 A1 | 7/2014 |

OTHER PUBLICATIONS

Office Action from European Patent Office on related EP application (EP17159551.5) dated May 14, 2019.
Office Action from European Patent Office on related EP application (EP17159551.5) dated Nov. 30, 2020.

* cited by examiner

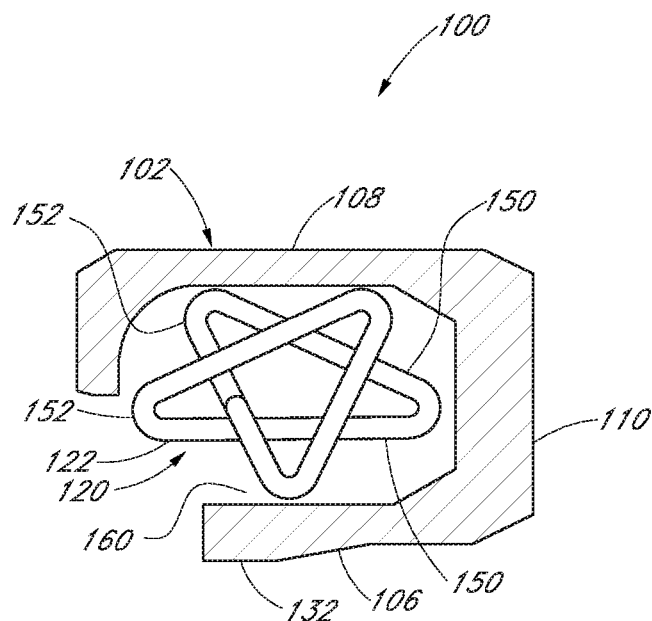
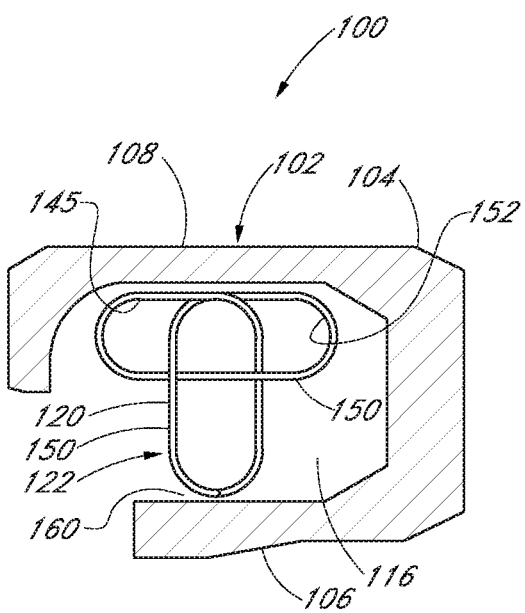
FIG. 9  FIG. 10
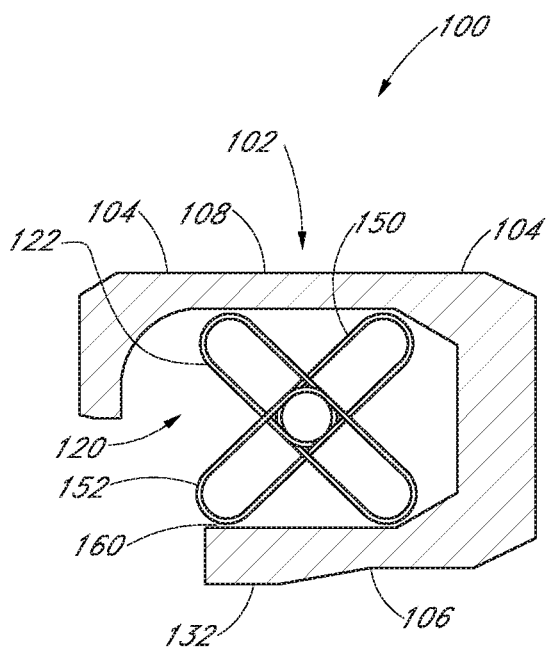
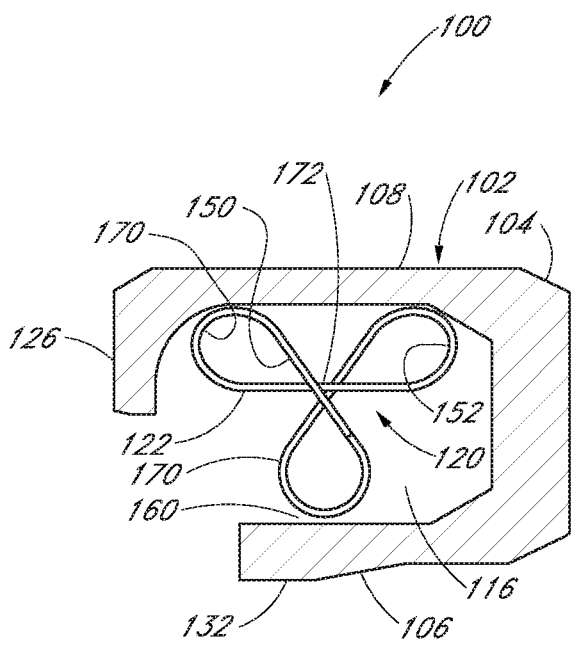
FIG. 11  FIG. 12

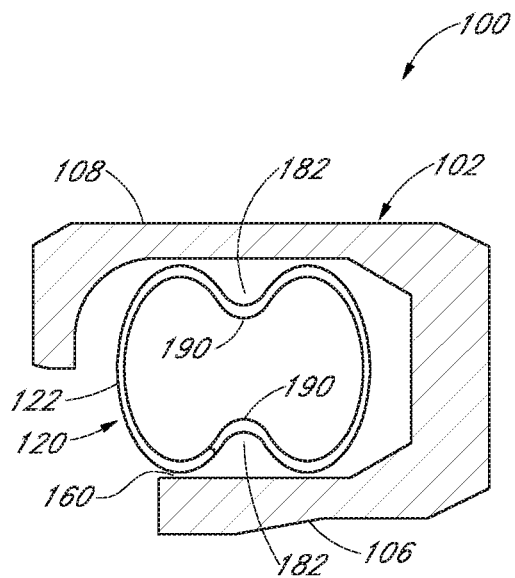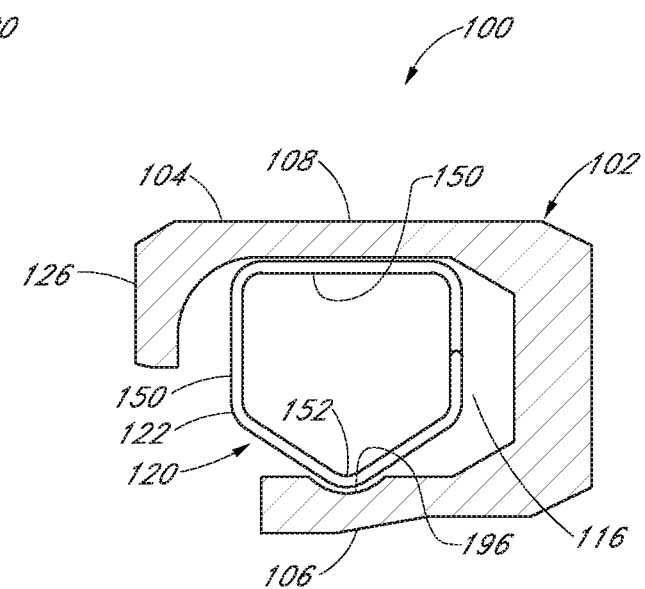
FIG. 17   FIG. 18
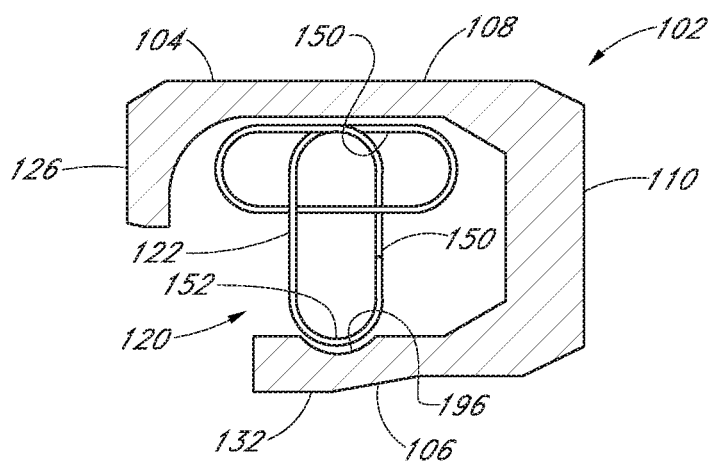
FIG. 19

SEAL ASSEMBLIES AND RELATED METHODS

FIELD OF ART

The invention is generally related to seal assemblies with specific discussions on spring energized seals, canted coil springs for use with the sealing elements, and related methods.

BACKGROUND

Conventional spring energized seals for sealing against a dynamic member, such as a shaft in rotary or reciprocating application, comprise a seal lip that may undergo gradual wear due to friction between the seal lip and the dynamic member. Among other things, a typical seal lip protrudes from a seal body and gradually extends towards the surface of the dynamic member, and thus due to this geometry, the sealing surface of the seal lip increases in area with increased lip wear. This is analogous to a typical sharpened pencil, which gradually dulls as the tip wears due to usage. The increased sealing surface area in situ can result in increased friction, which may cause the following undesirable results: increased wear, increased temperature, and/or increased resistance to rotation or reciprocation of the dynamic member. Continuance of increasing friction can be detrimental to the mechanical system and particularly to the seal ultimately leading to the possibility of failure.

Proper orientation of a spring, such as a canted coil spring ring, in a sealing element to ensure accurate load location and consistent load at different points along the sealing element are factors to a good working spring energized seal and may prolong seal life. The proper orientation and loading can increase stability of the canted coil spring within the spring cavity of the sealing element and can prevent the canted coil spring from rolling or tilting, which can cause the loading point to be off of optimal position or reduction of the load on the seal lip. Conventional spring energized seals have limited options for consistently loading the seal lips and can be prone to tilting or rolling.

SUMMARY

Aspects of the present disclosure include canted coil springs with complex coil shapes and spring energized seal assemblies utilizing the canted coil springs.

A spring energized seal assembly can include a sealing element or sealing member comprising a seal body with an inside flange defining a bore with an inside diameter for receiving a pin or a shaft and an outside flange for pressing against a housing. A center channel section is located between the inside flange and the outside flange and together with the inside and outside flanges defining a spring cavity or spring groove.

A canted coil spring can be located in the spring groove. The canted coil spring can comprise a plurality of interconnected coils. The coils of the canted coil spring can all cant generally along the same canting direction of a coil centerline passing through the center of each coil and a force acting perpendicular to the coil centerline can further cant the coils in the same canting direction. The canted coil spring has a spring centerline, which passes through the center of the spring ring when the two ends of the spring are connected to form a garter spring. The canted coil spring may be made from a metal material, from a metal alloy, or from a base material with one or more outer metallic layers or coats.

The canted coil springs described herein can be used with a sealing element to bias the inside and outside flanges away from one another. The canted coil springs can also be used in other seal applications, such as for a floating seal to prevent seal body rotation and for centering the seal assembly within a seal gland or housing, to name a few non-limiting examples.

The seal body may be made from an elastomeric material or a thermoplastic elastomer. Any number of prior art seal body materials may be used including polytetrafluoroethylene, PTFE. The outside flange sealing element can include a radial overhang, radial relative to the lengthwise axis passing through the bore of the seal body, to close up or close in the opening to the spring cavity thereby making it difficult for the canted coil spring to unintentionally jump out of the spring cavity. However, a radial overhang is not required and can be omitted or shortened. The spring energized seal assembly including the sealing member and the canted coil spring can be sized to fit and service the desired application.

Various corners of the seal body may be optionally be chamfered or radiussed to eliminate sharp corners. In yet other examples, the spring cavity may be modified by changing the length of one or both flanges, the thickness of one or both flanges, and/or the height and/or thickness of the center channel section.

The inside flange can include a sealing lip, which can be a raised or extended surface extending radially of the base of the inside flange to function as a structure or element that presses against a surface to be sealed, such as a shaft or a pin that rotates or reciprocates about the inside bore defined by the inside flange of the spring energized seal.

Optionally, the outside flange can also be provided with a sealing lip.

The cross-section of the sealing lip can vary to form an elongated line contact with the surface to be sealed or a short line contact with the surface to be sealed.

The loading of the sealing lip by the canted coil spring to press against the surface to be sealed can vary by modifying the contact type between the coils of the canted coil spring and the inside flange surface of the inside flange.

Relative to the spring cavity, the inside flange and the outside flange of the seal body both have inside flange surfaces and outside or external flange surfaces. In an example, at least one of the two inside flange surfaces can have a generally flat or planar surface.

The inside surface of the center channel section of the seal body may also have a generally planar or flat surface but not necessary. In an example, the inside surface of the center channel section cam incorporate a surface that is selected to accommodate the shape of a side segment or section of the coils of the canted coil spring. However, when the coil is spaced from the center channel section, the shape of the inside surface is not critical.

The coil of the canted coil spring can have a coil shape defined by two generally parallel straight segments with a curved or arcuate connecting end or segment at each end joining the two generally parallel straight segments together.

The canted coil spring can be located inside the spring groove to bias the inside flange and the outside flange away from one another. When the canted coil spring is located in the spring groove, the canted coil spring generally contacts and biases both the inside flange and the outside flange away from one another. In some examples, the canted coil spring, as a spring ring, can be used as a tension spring only and biases against the inside flange but not the outside flange.

In some examples, a locking ring with a leaf spring may be included to secure the sealing element to the housing of the seal gland. When incorporated, the locking ring is typically attached to the outside flange of the sealing element and has a section that extends into the spring cavity. When such locking ring is used, the canted coil spring can bias against the inside flange and the section of the locking ring that extends into the spring cavity.

Each coil of a canted coil spring can have a coil height CH or shorter of two coil axes, which is generally orthogonal to the seal assembly centerline, or the pin axis when mounted, and a coil width CW or longer of the two coil axes, which is generally parallel to the seal assembly centerline, or the pin axis when mounted and for a radial canted coil spring.

The coils of the canted coil spring exert a spring force along the coil height to bias the two flanges away from one another. However, the canted coil spring can be coiled, such as during turning of a metal wire to form the canted coil spring, to cant along a different axis so that the coils that deflect radially of the coil centerline can be the longer of two axes. Thus, a coil height CH can be longer than a coil width CW and the coils can still deflect along the coil height. Accordingly, in some instances, when called out, the coil height CH can be designated as the shorter of two axes of the coil or the longer of two axes of the coil due to modification of the coils to enable them to deflect or cant along an axis that differs from a traditional axis, such as typically along a coil height or the short of the two axes.

Two straight segments of each coil of a canted coil spring can be sized and shaped, such as being configured, to form line contacts with the inside surfaces of the inner flange and the outer flange of a sealing element or sealing member. Due to the two line contacts between the two straight segments and the two generally planar or flat inside surfaces of the two flanges, the seal body can be loaded properly by the canted coil spring.

The line contact can provide an even load to the inside flange to more evenly distribute the spring or biasing force of the canted coil spring against the sealing lip to seal against the dynamic surface, such as a pin or a shaft.

The proper orientation and loading of a canted coil spring within a spring groove or spring cavity can also increase stability for the canted coil spring within the spring cavity sealing element or sealing member and can prevent the canted coil spring from rolling or tilting, which can cause the loading point to be off of optimal position or reduction of the load on the seal lip.

In some examples, only a single straight line contact between the canted coil spring and the seal body is needed to provide stability and reduce possible rolling or tilting within the spring cavity. In still other examples, the single line contact between the canted coil spring and the seal body can be along the generally flat or planar inside surface of the center channel section.

The coils of the plurality of canted coil spring in accordance with further aspects of the present disclosure can each comprise three generally straight coil segments connected to one another by curved or arcuate connecting ends forming a polygonal shape coil, in particular a triangular shape coil resembling an equilateral triangle with curved connecting ends.

In an example, only one straight coil segment forms a line contact with the inside flange surface of the outside flange of a sealing element. In other examples, the coils of the canted coil spring having the triangular shape can be coiled differently so that the one straight coil segment forms a line contact with the inside flange surface of the inside flange of a sealing element.

The single straight line contact between the canted coil spring and the seal body of the sealing element, in particular the inside surface of the outside flange, can provide stability and reduces possible rolling or tilting of the coils within the spring cavity. The curved or arcuate connecting end of the coil biasing against the inside flange surface of the inside flange can form an extended point contact with the inside flange of a sealing element or sealing member.

An extended point contact can concentrate the biasing force of each coil of the plurality of coils to a smaller area of the inside flange to increase the pressure at the sealing point of the contact. For example, where high sealing contact with a shaft is desired, an extended point contact may be utilized. Further, the position or location of the curved connecting end acting against the inside surface of the inside flange can be shifted left or right along the spring axis by changing the lengths of the straight segments and the curvature of the curved connecting ends.

The spring energized seal can have one line contact and one extended point contact between the sealing element and the individual coils of the canted coil spring located in the spring cavity of the sealing element or sealing member.

A straight line contact can be a contact formed between a straight segment of a coil and a generally planar or straight surface of a seal body, such as a surface on the inside flange or the outside flange of the seal body. A line contact can form from a straight section or segment of a coil that is about 25%, such as 22%, 25%, 27%, or more of the coil width up to 100% of the straight segment of the coil.

An extended point contact can be a contact formed between a curved component, such as a curved or arcuate connecting end or a curved side segment, of a coil and a surface of a seal body, such as a surface on the inside flange or the outside flange of the seal body. Extended point contacts can form from a sharp bend or a more gradual bend on the coil.

A canted coil spring of the present disclosure can have coils that are polygonal in shape, such as triangular in shape and in particular a right angled triangle. The coil can have three straight segments connected to one another by three curved or arcuate connecting ends. One of the straight segments can form a line contact with the inside flange surface of the outside flange and one of the curved or arcuate connecting ends can form an extended point contact with the inside flange surface of the inside flange of a sealing element or sealing member.

The coils having the right angled triangle can be coiled differently so that the line contact can be with the inside flange and the extended point contact can be with the outside flange of a seal body of a sealing element or sealing member.

The location of the extended point contact with the inside flange can be shifted to contact a different location of the inside flange to focus the sealing pressure along a different section of the inside flange. The contact location of the arcuate connecting end and the inside flange can be shifted by changing the triangular shape of the coil, such as the lengths of one or more segments and the curvature of the curved connecting ends, to change the location of the extended point contact contacting the inside flange of a sealing element or sealing member.

The spring energized seal of the present disclosure can have one line contact and one extended point contact between the sealing element and the individual coils of the canted coil spring located in the spring cavity of the sealing element.

In some examples, the coils of the canted coil spring can have a polygonal shape, in particular a generally square shape coil with four generally straight coil segments connected to one another by four arcuate or curved connecting ends.

Each coil can have two line contacts with the seal body, one with the inside surface of the inside flange and one with inside surface of the outside flange. A third line contact can be incorporated by placing one of the other straight segments of the coil in contact with the inside surface of the center channel section of the seal body.

The spring energized seal assembly can have two line contacts between the sealing element and the individual coils of the canted coil spring located in the spring cavity of the sealing element.

The coils of the canted coil spring can have a polygonal shape, in particular a rhombus shape with four generally straight coil segments connected to one another by four arcuate or curved connecting ends. Each coil can form two extended point contacts with the seal body, one with the inside surface of the inside flange and one with the inside surface of the outside flange of a sealing element or sealing member.

The spring energized seal can have two extended point contacts between the sealing element and the individual coils of the canted coil spring located in the spring cavity of the sealing element. A four sided coil of a canted coil spring can be arranged to have two extended point contacts between the sealing element and the individual coils of the canted coil spring but no line contact.

The coils of the canted coil spring can have a polygonal shape, in particular a pentagon shape with five generally straight coil segments connected to one another by five arcuate or curved connecting ends. None of the straight segments of the coil can be parallel with any other straight segment. In other examples, at least two of the straight segments can be parallel. One of the straight segments can form a line contact with the inside flange surface of the outside flange and one of the curved or arcuate connecting ends can form an extended point contact with the inside flange surface of the inside flange of a sealing element or sealing member.

In some examples, the coils having the pentagon shape can be coiled differently so that the line contact is with the inside flange and the extended point contact is with the outside flange. Further, the location of the extended point contact with the inside flange can be shifted to contact a different location of the inside flange to focus the sealing pressure along a different section of the inside flange. The contact location of the arcuate connecting end and the inside flange can be shifted by changing the lengths of the straight segments and the shapes of the curved connecting ends.

The present spring energized seal can have one line contact and one extended point contact between the sealing element and the individual coils of the canted coil spring located in the spring cavity of the sealing element.

The coils of the canted coil spring can have a polygonal shape, in particular a trapezoid shape with four generally straight coil segments, two of the four straight coil segments can be generally parallel to one another, and the four straight segments can be connected to one another by four arcuate or curved connecting ends.

One of the straight segments can form a line contact with the inside flange surface of the outside flange and one of the curved or arcuate connecting ends can form an extended point contact with the inside flange surface of the inside flange. In some examples, the coils having the trapezoid shape can be coiled differently so that the line contact is with the inside flange and the extended point contact is with the outside flange.

A four sided coil of a canted coil spring of the present disclosure can be arranged to have one line contact and one extended point contact between the sealing element and the individual coils of the canted coil spring located in the spring cavity of the sealing element.

The coils of the canted coil spring can have a polygonal shape, in particular a pentagon shape with five generally straight coil segments connected to one another by five arcuate or curved connecting ends. Two of the straight segments can be parallel to one another.

One of the straight segments can form a line contact with the inside flange surface of the outside flange and one of the curved or arcuate connecting ends can forms an extended point contact with the inside flange surface of the inside flange.

In some examples, the coils having the pentagon shape can be coiled differently so that the line contact is with the inside flange and the extended point contact is with the outside flange of a sealing element. The contact location of the arcuate connecting end and the inside flange can be shifted by changing the lengths of some of the straight segments and the shapes of the curved connecting ends connecting them.

The spring energized seal can have one line contact and one extended point contact between the sealing element and the individual coils of the canted coil spring located in the spring cavity of the sealing element.

The coils of the canted coil springs of the present disclosure can have a complex coil shape with coil segments that cross, intersect, and/or form loops within the same coil of the canted coil spring. A canted coil spring can include a plurality of coils each with a non-elliptical and non-rectangular shape.

The coil can have a star-shaped geometry with the wire of the canted coil spring following a pentagram pattern. The coil can have a plurality of straight segments connected to one another by curved connecting ends. Due to the unique cross-sectional shape of the star-shaped canted coil spring, the number of contact points between the seal body and the canted coil spring can include three extended point contacts, two at the inside flange surface of the outside flange and one at the inner flange surface of the inside flange. In some examples, the coils having the star shape can be coiled differently so that the two extended point contacts is with the inside flange and the single extended point contact is with the outside flange of a sealing element.

The two spaced apart extended point contacts with the outside flange can provide stability and resists spring rolling or tilting within the sealing element or sealing member.

In a further example, the coils of a canted coil spring can have a generally parallel straight segments joined by curved connecting ends and arranged in a "T" shape. The coil can be viewed as having two similar coil sub-sections that are turned relative to one another to form the "T" shape. One of the straight segments of the "T" shape coil can form a line contact with the inside flange surface of the outside flange and one of the curved or arcuate connecting ends of the coil can form an extended point contact with the inside flange surface of the inside flange of a sealing element or sealing member.

In some examples, the coils can be coiled differently so that the line contact for the "T" shape coil is with the inside flange and the extended point contact is with the outside flange. Further, the location of the extended point contact with the inside flange can be shifted to contact a different location of the inside flange to focus the sealing pressure along a different section of the inside flange. The contact location of the arcuate connecting end and the inside flange can be shifted by changing the "T" shape configuration. sealing element The coils of the canted coil spring can alternatively have an "X" shape configuration. The "X" shape coil can be formed by connecting a plurality of straight segments with curved connecting ends to provide a wide working range of deflection. The "X" shape of the coil can provide multiple spaced apart extended point contacts with the inside and outside flanges of the sealing element. Two spaced apart extended point contacts can be provided at the inside flange surface of the outside flange and two spaced apart extended point contacts can be provided at the inside flange surface of the inside flange of a sealing element or sealing member.

A coil of a canted coil spring can have multi-loops and each coil with a geometry that resembles a three-leaf clover. Said multi-loop geometry can comprise multiple tear drop shaped loops each with a curved connecting end joining straight segments together. The tear drop shaped loops can converge at a common internal point or location.

Due to the unique cross-sectional shape of the three-leaf clover coil shape canted coil spring, multiple spaced apart extended point contacts with the inside and outside flanges of the sealing element can be provided. Two spaced apart extended point contacts can be provided at the inside flange surface of the outside flange and one extended point contact can be provided at the inside flange surface of the inside flange. In some examples, the coils with the three-leaf clover configuration can be coiled differently so that the two extended point contacts is with the inside flange and the single extended point contact is with the outside flange of a sealing element.

Another example is a coil of a canted coil spring with multi-loops and with a geometry that resembles a four-leaf clover. Said multi-loop geometry can comprise four loops each with a curved connecting end joining straight segments together. The loops can converge at common internal point or location and have common straight segments when viewing along a cross-sectional profile.

Due to the unique cross-sectional shape of the coil of the canted coil spring with the four-leaf clover configuration, multiple spaced apart extended point contacts with the inside and outside flanges of the sealing element can be provided. In the example shown, two spaced apart extended point contacts can be provided at the inside flange surface of the outside flange and two extended point contacts can be provided at the inside flange surface of the inside flange.

In another example, the coil of the plurality of coils of the canted coil spring can have a plurality of non-elliptical and nonrectangular shape coils each comprising at least one interior loop that is located or arranged entirely within an outer contour of the cross-sectional profile of the coil. The loop can form a dimple on one of the sides of the coil located between two curved connecting ends to form two spaced apart projections on the coil to provide two extended point contacts with the inside surface of the outside flange of a sealing element or sealing member.

The coil with the interior loop can also have a section that can embody a straight segment to form a line contact with the inside surface of the inside flange or can be curved to form an extended point contact with the inside flange. In some examples, the curved side segment can include a straight section that is about 25% of the coil width to thereby form a line contact with the inside flange.

Due to the canted coil spring's multi-contact design in which a coil can have an interior loop, the canted coil spring of the present embodiment is able to maintain its position with little to no spring rolling or tilting within the spring cavity. In some examples, the coils having the interior loops can be coiled differently so that the line contact is with the outside flange and the two extended point contacts formed by the dimple are with the inside flange of a sealing element or sealing member.

In another example, the coils of the canted coil spring can have a polygonal shape with three generally straight coil segments with two of the three straight coil segments being generally parallel to one another but with a fourth segment being generally curved or arcuate, such as an arcuate or curved side segment, to form a shape that is similar to a loaf of bread. The straight segments can be connected to one another by four arcuate or curved connecting ends.

One of the straight segments of the "loaf of bread" coil configuration can form a line contact with the inside flange surface of the outside flange and the curved side segment can form an extended point contact with the inside flange surface of the inside flange. In some examples, the coils having the "loaf of bread" configuration can be coiled differently so that the line contact is with the inside flange and the extended point contact is with the outside flange.

The present embodiment demonstrates that a four sided coil of a canted coil spring can be arranged to have one line contact and one extended point contact between the sealing element and the individual coils of the canted coil spring.

In some examples, the curved side segment of the coil having the loaf of bread configuration can include a straight section that is about 25% of the coil width to thereby form a line contact with the inside flange of a sealing element or sealing member. In some examples, the curved side segment can include a dimple so as to provide that side of the coil with two spaced apart curved ends or spaced apart projections to generate two extended point contacts with a seal flange of a sealing element.

In another example, the coil of a canted coil spring can be generally elliptical and has a major axis and a minor axis and a dimple formed on the coil to create an inward arc section to thereby form two spaced apart projections to provide two extended point contacts with the inside flange of a sealing element or sealing member. In some examples, the coils of the elliptical shaped coil with a dimple can be coiled differently so that the dimple and the inward arc section are located to contact the outside flange of a sealing element or sealing member. Thus, the a spring energized seal of the present disclosure having a canted coil spring with an elliptical shaped coil can have at least three extended point contacts between the sealing element and the individual coils of the canted coil spring. The three extended point contacts can be incorporated without the coil having any straight segment.

The coil of a canted coil spring can alternatively be generally elliptical and has a major axis and a minor axis and two dimples formed on the coil to create two inward arc sections to thereby form two spaced apart curved ends or spaced apart projections to provide extended point contacts with the inside flange and two extended point contacts with the outside flange of a sealing element or sealing member. Thus, the present spring energized seal with two dimples can have four extended point contacts between the sealing element and the individual coils of the canted coil spring. The four extended point contacts can be incorporated without the coil having any straight segment.

The inside surface of the inside flange of a sealing element can be provided with a dimple. Where a seal body has multiple extended point contacts with the coils of a canted coil spring, multiple dimples may be provided on the seal body to accommodate each curved connecting end or curved side segment of the coils of the canted coil spring. For example, a dimple can be provided to the inside surface of the outside flange and the inside surface of the inside flange of the seal body.

The dimple on the seal body can be sized, shaped and arranged to receive a curved connecting end or a curved side segment of a coil to thereby form an engagement between the coil and the seal body of the sealing element. In an example, the dimple is configured to engage the curved connecting end or a curved side segment of a coil of the plurality of coils of a canted coil spring.

The orientation and loading provided by the canted coil spring having multiple extended point contacts and/or at least one line contact with a seal body can increase stability of the canted coil spring within the spring cavity and can prevent the canted coil spring from rolling or tilting, which can cause the loading point to be off of optimal position or reduction of the load on the seal lip. Additionally, the engagement between the dimple on the inside surface of the inside flange and the curved connecting end of the coil can ensure optimum alignment and further resists movement of the canted coil spring within the spring cavity.

Any of the various canted coil springs described herein having a curved connecting end, a curved segment on a side of the coil, or a dimple on the coil to create spaced apart projections or spaced apart curved ends for forming an extended point contact can be used with a seal body having one or more dimples formed on the inside flange surface of the inside flange and/or the inside flange surface of the outside flange.

In an alternative embodiment, the outside surface of the inside flange of a seal body can be provided with a dimple. The dimple can create two spaced apart sealing lips along the outside surface of the inside flange for sealing against a surface, such as a shaft or a pin. A canted coil spring in which coils having two curved connecting ends can be used with the inside flange with two sealing lips so that the two curved connecting ends bias directly over the same area as the two sealing lips.

In some examples, a canted coil spring in which coils have a straight segment can be used with the inside flange with two sealing lips so that the straight segment of the coil can bias directly over the same area as the two sealing lips, and also to surface of the flange over the area having the void created by the dimple.

The dimple can be formed to both the outside surface of the inside flange and the outside surface of the outside flange of a sealing element or sealing member.

A coil of a canted coil spring having a plurality of straight segments connected to one another by curved connecting ends and wherein one of the sides of the coil includes an internal loop to form a dimple to create or form two spaced apart projections or curved ends to provide two extended point contacts with the inside surface of the inside flange having the dimple on the outside surface to form two sealing lips. Further, the two curved ends of the coil formed by the internal loop can be sized and shaped to locate directly over the two sealing lips formed by the dimple on the inside flange. This allows the coils of the single canted coil spring to provide two load points against the inside surface of the inside flange to bias the two sealing lips away from the outside flange of the sealing element.

The coil of a canted coil spring can have a generally elliptical shape with a major axis and a minor axis and two dimples formed on the coil to create two inward arc sections to thereby form two spaced apart curved ends or spaced apart projections to provide two extended point contacts with the inside flange and two extended point contacts with the outside flange. Such coil with two dimples can be used with sealing elements in which one or more dimples are provided to the outside surface of the inside flange, the outside flange, or both. Two curved ends formed by one of the dimples of the coil can be sized and shaped to locate over the two sealing lips formed by the dimple on the inside flange.

A sealing element or sealing member can have a seal body with an inside flange, an outside flange, and a center channel section collectively defining a spring cavity. The inside flange can have a sealing lip. The outside flange can omit a radial overhang. The outside flange can optionally include a sealing lip.

A canted coil spring comprising a plurality of coils in which a coil of the plurality of coils can include a flange biasing coil and a seal biasing coil. The flange biasing coil and the seal biasing coil can both have two straight segments that are connected to one another by curved or arcuate connecting ends and wherein the two coil types can be rotated relative to one another. Part of the two straight segments of the flange biasing coil can be located within the spring cavity of the sealing element and form line contacts with the inside flange surface of the inside flange and the inside flange surface of the outside flange.

One of the curved connecting ends of the flange biasing coil can optionally contact the inside surface of the center channel section of the sealing element. The flange biasing coil can be configured to bias the inside and outside flanges away from one another so that when in service, the sealing lip of the inside flange is biased against the surface to be sealed, such as a shaft.

The seal biasing coil can be rotated relative to the flange biasing coil so that one of the two straight segments of the seal biasing coil is oriented to contact one or both terminal ends of the inside and outside flanges of the seal body. The other one of the two straight segments of the seal biasing coil can be oriented to contact part of a gland, housing, or stuffing box or a structure to which the spring energized seal assembly is positioned. For example, one straight segment of the seal biasing coil is configured to push against a stationary housing surface of the environment that the seal assembly is positioned in and the other straight segment is configured to push against one or both terminal ends of the two seal flanges. The seal biasing coil is therefore configured to load the seal assembly in the axial direction to bias the seal assembly towards proper position within the seal gland of the equipment to be sealed.

In some examples, a canted coil spring, such as one of the canted coil springs shown and described elsewhere herein, can be incorporated to an outside diameter of a sealing element or sealing member, such as to an outside flange of the seal body or to the outside diameter portion of the center channel section. Such utilization of the canted coil spring to the outside diameter of the sealing element can be used in a floating seal application to improve the seal life of the sealing element of the floating seal. For example, the externally mounted canted coil spring can prevent rotation of the sealing element relative to the shaft within the housing while allowing or permitting axial movement of the sealing element along the shaft. The coils of the canted coil spring to be used on the outside diameter of the sealing element can include multiple contact points, such as by incorporating a dimple or a recessed coil segment to produce two or more spring contact segments or apexes, such as spaced apart projections. This can increase the surface contact areas and thus friction and can provide stability of the spring in terms of orientation and load direction.

Spring energized seal assemblies described herein can be located inside a seal gland with the inside flange of the seal body biased against the shaft and the outside flange biased against the housing. Optionally, the spring energized seal assemblies described herein can be used in static applications to seal a gap between two stationary surfaces. A canted coil spring with a plurality of coils can be located in a spring cavity defined by the inside flange, the outside flange, and the center channel section of a sealing element. The outside flange can optionally be provided with a radial overhang.

A sealing element or sealing member disclosed herein can incorporate a spring groove along the outside diameter of the seal body, at or near the center channel section, or at or near the outside flange. The spring groove can be formed as a channel along the outside diameter of the seal body and can be called an outside or outer spring groove. The outside or outer spring groove on the outside diameter can have different shapes, including a V-shaped groove, a groove with two sidewalls and a bottom wall located therebetween. The spring groove along the outside can be sized and shaped for accommodating a canted coil spring. For discussion purposes, the canted coil spring located in the spring groove for biasing the two flanges can be called a first canted coil spring and the canted coil spring located in the spring groove along the outside diameter can be called a second canted coil spring. The second canted coil spring can be incorporated in the spring groove to assist with centering the seal assembly relative to the bore of the seal gland. The first and second canted coil springs can have the same shaped coils or can have different coils. Depending on the size of the spring groove located along the outside diameter of the seal body, the first and second canted coil springs can have the same shape or different shapes but of different overall sizes.

The second canted coil spring located in the spring groove can be any of the various canted coil springs discussed elsewhere herein but sized to fit within the spring groove.

Any of the seal assemblies with the various canted coil springs described elsewhere herein can be used in a seal gland and can incorporate an outside spring groove to accommodate a second canted coil spring.

A canted coil spring can have a number "8" configuration that is turned, similar to an infinity symbol. The coil with the infinity symbol can have two lobes or loops per coil and wherein the same two loops per coil can contact both the housing and the outside or outer spring groove, such as the bottom wall of the spring groove. The coil with the infinity symbol can also be used as a first canted coil spring for biasing the inside flange and the outside flange of a sealing element away from one another.

Spring energized seal assemblies described herein can also be piston mounted instead of housing mounted. That is, the spring energized seal assembly can be mounted onto a piston and then the combination piston and spring energized seal assembly installed into the housing. A sealing lip can be provided with both the inside flange and the outside flange of the sealing element or sealing member.

A sealing element of the present disclosure can have a seal body with an inside flange, an outside flange, and a center channel section defining a spring cavity. The inside flange can have a sealing lip. The outside flange can be without a radial overhang, similar. The coil of the canted coil spring usable with the seal body without a radial overhang can have a portion that is located within the seal cavity of the seal body and a portion that is external of the seal body.

A coil of a canted coil spring having multi-loops and each coil with a geometry that resembles a three-leaf clover can be used as a combination canted coil spring to bias the two flanges of the sealing element and to bias the terminal ends of the two flanges, as discussed above with reference to a sealing element without a radial overhang. Said multi-loop geometry coil can comprise multiple tear drop shaped loops each with a curved connecting end joining straight segments together. The tear drop shaped loops can converge at a common internal point or location when viewing the cross-sectional profile.

One of the tear drop loops can be located in the spring cavity of a sealing element to bias the inside flange and the outside flange away from one another and can be called a flange biasing coil. In the example shown, the tear drop loop that biases the two flanges can be spaced from the center channel section. In other examples, the tear drop loop flange biasing coil can be elongated to touch or abut the center channel section.

Two of the tear drop loops can be located externally of the spring cavity and can be called a seal biasing coil. Alternatively, the flange biasing coil can be called an internal loop and the seal biasing coil can be called external loops. The two externally located tear drop loops can share a common straight segment that is arranged to abut two terminal ends of the inside flange and of the outside flange of the seal body When a spring energized seal with a canted coil spring having multi-loops with internal and external loops is mounted over a shaft or pin and in a seal gland, the internal loop can located in the spring cavity to bias the inside flange and the outside flange away from one another and the external loops can be oriented to contact part of a gland, housing, or stuffing box or a structure to which the spring energized seal assembly is positioned while the common straight segment is configured to push against one or both terminal ends of the two seal flanges. The seal biasing coil external loops are therefore configured to load the seal assembly in the axial direction to bias the seal assembly towards proper position within the seal gland of the equipment to be sealed.

Spring energized seal assemblies can include dual seal assemblies in that each seal assembly can have two back-to-back sealing elements each with a seal body, an inside flange, an outside flange, a center channel section, and a spring cavity and wherein the two seal bodies share a single canted coil spring. Only the inside flange of the two seal bodies or both the inside flange and the outside flange of the two sealing bodies of the dual seal assembly can each have one or more sealing lips.

A single canted coil spring with a plurality of coils can project into both sealing cavities of the two back-to-back seal bodies to bias the inside flange away from the outside flange for each sealing body. The single canted coil spring for use with the two seal bodies can have straight segments, curved connecting ends, and/or multi-loops. The coils of the single canted coil spring can project into the cavity of each seal body of a two seal body back-to-back dual seal assembly and having coil sections or segments that contact the housing and the shaft to which the dual seal assembly is installed.

In some examples, the spring energized seal assemblies having a second spring groove along an outside diameter for accommodating a second canted coil described herein can be used for EMI shielding. It is known that all electromagnetic waves consist of two essential components: a magnetic field and an electric field. These two fields are perpendicular to each other, and the direction of wave propagation is at right angles to the plane containing these two components. The relative magnitude between the magnetic (H) field and the electric (E) field depends on how far away the wave is from its source and on the nature of the generating source itself. The ratio of E to H is called the wave impedance, Z. The spring energized seal assemblies of the present invention provides an effective electromagnetic shield through the use of a canted-coil spring with closely spaced coils that deflect upon loading, for providing a nearly constant force between mating points and/or surfaces, in order to assure a high degree of conductivity, and therefore a high shield effectiveness, within useful temperature and cycling requirements.

In some examples, the dual seal assembly having back-to-back seal bodies and a single canted coil spring can be used for EMI shielding. The single canted coil spring contacting the housing and shaft, in addition to the two seal cavities defined by the two seal bodies, provides an effective electromagnetic shield through the use of a canted-coil spring with closely spaced coils that deflect upon loading.

In some examples, the canted coil springs described herein can be embedded or formed into or formed with a silicon or elastomeric ring. In other words, an O-ring like structure can be provided with one of the canted coil springs described herein embedded therein, which can be called a silicon filled or an elastomeric filled canted coil spring having coils as described elsewhere herein. More broadly speaking, the coils of the canted coil spring can be filled with an elastic non-metallic material. The elastomer or silicon can be filled in the center of the coils and in between the coils or the coil center can remain hollow. The elastomer or silicon filled canted coil spring can be used with a sealing element or sealing member to bias the inside flange and the outside flange away from one another. The elastomer or silicon filled canted coil spring can be used to prevent material, debris, or unwanted materials from entering the spring coils of the canted coil spring. For the various canted coil springs described herein, a plurality of coils of any one canted coil spring can all have the same unique coil configuration or only a subset of the plurality of coils can have the unique coil configuration.

The present disclosure is further understood to include methods for making and for using any one or more of the various spring energized seal assemblies and unique canted coil springs discussed herein.

Aspects of the present disclosure include a spring energized seal assembly comprising a sealing member having a seal body with an annular opening, an inside flange defining the annular opening, an outside flange, a center channel section located between the inside flange and the outside flange, and a spring cavity defined by the inside flange, the outside flange, and the center channel section; a canted coil spring located in the spring cavity of the seal body, said canted coil spring comprising plurality of coils, at least two coils of the plurality of coils each comprising a coil width, at least one straight segment having a straight section that is at least 25% of the coil width, and wherein the at least one straight segment contacts the inside flange or the outside flange of the seal body to form a line contact with the seal body.

The inside flange can comprise an interior flange surface comprising a notch formed with the interior flange surface of the inside flange.

Each of the at least two coils can comprise a curved connecting end located in the notch of the inside flange.

At least two coils each of the canted coil spring can comprise a dimple forming an internal loop and defining two spaced apart projections, and wherein the two spaced apart projections can contact the inside flange at two spaced apart locations on the inside flange.

The inside flange can comprise a recessed area along an outer surface of the inside flange to define two sealing lips, and wherein the two spaced apart projections of the at least two coils can align with the two sealing lips.

At least two coils each of the canted coil spring can comprise a curved connecting end and wherein the curved connecting end can contact the other one of the inside flange or the outside flange.

At least two coils each of the canted coil spring can comprise a second straight segment having a straight section that is at least 25% of the coil width.

At least two coils each of the canted coil spring can comprise a coil height and wherein the coil width is greater in length than the coil height.

The canted coil spring can be filled or coated with an elastic non-metallic material.

The sealing member can comprise an outer spring groove on an outside diameter of the sealing member and wherein a second canted coil spring can be located in the outer spring groove.

The spring energized seal assembly can be used in an EMI shielding application.

The sealing member can be a first sealing member and the spring energized seal assembly can further comprise a second sealing member comprising a spring groove, and wherein the canted coil spring is partially located in the spring groove of the second sealing member as well as in the spring groove of the first sealing member.

The canted coil spring that is located in the first sealing member and the second sealing member can contact a housing and a shaft when the spring energized seal assembly is installed in a seal gland.

A further aspect of the present disclosure include a spring energized seal assembly comprising: a sealing member having a seal body with an annular opening, an inside flange defining the annular opening, an outside flange, a center channel section located between the inside flange and the outside flange, and a spring cavity defined by the inside flange, the outside flange, and the center channel section; a canted coil spring with a complex coil shape located in the spring cavity, said canted coil spring comprising a continuous wire forming a plurality of coils, a spring axis through said plurality of coils, and a cross-sectional profile when viewed in a direction of said spring axis; each coil of said plurality of coils canted about an axis generally perpendicular to said spring axis; said cross-sectional profile having a multi-loop geometry with said wire following a repeating pattern of distinct loops to define said multi-loop geometry; and wherein two spaced apart loops of the canted coil spring define two spaced apart curved connecting ends that simultaneously contact the inside flange or the outside flange.

The plurality of coils can each comprise a star shape, a three-leaf clover shape, a four-leaf clover shape, or an X-shape.

A curved connecting end can be provided with the plurality of coils and wherein each connecting end can contact the other one of the inside flange or the outside flange.

The inside flange of the sealing member can comprise an inside flange surface and an outside flange surface, and wherein a dimple can be provided on the outside flange surface to define two spaced apart sealing lips.

A still further aspect of the present disclosure include a spring energized seal assembly comprising: a sealing member having a seal body with an annular opening, an inside flange defining the annular opening, an outside flange, a center channel section located between the inside flange and the outside flange, and a spring cavity defined by the inside flange, the outside flange, and the center channel section; a canted coil spring located in the spring cavity of the seal body, said canted coil spring comprising plurality of coils each with a generally elliptical shape, and wherein a dimple is formed on at least five coils of said plurality of coils to define two spaced apart projections on each of said at least five coils; and wherein the two spaced apart projections on each of said at least five coils contact the inside flange or the outside flange of the seal body to form multiple extended point contacts between each of the at least five coils and the inside flange or the outside flange.

The inside flange of the sealing member can comprise an inside flange surface and an outside flange surface, and wherein a dimple can be provided on the outside flange surface to define two spaced apart sealing lips. The two spaced apart projections on each of the at least five coils can be aligned with the two spaced apart sealing lips.

A yet further aspect of the present disclosure include a spring energized seal assembly comprising a sealing member having a seal body with an annular opening, an inside flange defining the annular opening, an outside flange, a center channel section located between the inside flange and the outside flange, and a spring cavity defined by the inside flange, the outside flange, and the center channel section; a canted coil spring located in the spring cavity of the seal body, said canted coil spring comprising plurality of coils each with four segments and four curved connecting ends joining the four segments; and wherein a first of the four curved connecting ends contacts the inside flange and a second of the four curved connecting ends contacts the outside flange.

The inside flange of the sealing member can comprise a notch and wherein the first of the four curved connecting ends can contact the notch of the inside flange.

A yet further aspect of the present disclosure is a method of using a spring energized seal assembly. The method can comprise mounting a sealing element with a canted coil spring in a housing or on a shaft; the sealing member having a seal body with an annular opening, an inside flange defining the annular opening, an outside flange, a center channel section located between the inside flange and the outside flange, and a spring cavity defined by the inside flange, the outside flange, and the center channel section; the canted coil spring is located in the spring cavity and the canted coil spring comprising plurality of coils, at least two coils of the plurality of coils each comprising a coil width, at least one straight segment having a straight section that is at least 25% of the coil width, and wherein the at least one straight segment contacts the inside flange or the outside flange of the seal body to form a line contact with the seal body.

BRIEF DESCRIPTION OF DRAWINGS

These and other features and advantages of the present devices, systems, and methods will become appreciated as the same becomes better understood with reference to the specification, claims and appended drawings wherein:

FIG. 9 shows a spring energized seal assembly comprising a sealing element with a spring groove or spring cavity having a canted coil spring located therein with another alternative canted coil spring embodiment.

FIG. 10 shows a spring energized seal assembly comprising a sealing element with a spring groove or spring cavity having a canted coil spring located therein with another alternative canted coil spring embodiment.

FIG. 11 shows a spring energized seal assembly comprising a sealing element with a spring groove or spring cavity having a canted coil spring located therein with another alternative canted coil spring embodiment.

FIG. 12 shows a spring energized seal assembly comprising a sealing element with a spring groove or spring cavity having a canted coil spring located therein with another alternative canted coil spring embodiment.

FIG. 17 shows a spring energized seal assembly comprising a sealing element with a spring groove or spring cavity having a canted coil spring located therein with another alternative canted coil spring embodiment.

FIG. 18 shows a spring energized seal assembly comprising a sealing element with a spring groove or spring cavity having a canted coil spring located therein engaging a dimple on the sealing element or sealing member.

FIG. 19 shows a spring energized seal assembly comprising a sealing element with a spring groove or spring cavity having a canted coil spring located therein engaging a dimple on the sealing element with an alternative canted coil spring embodiment.

DETAILED DESCRIPTION

The detailed description set forth below in connection with the appended drawings is intended as a description of the presently preferred embodiments of canted coil springs and spring energized seals provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
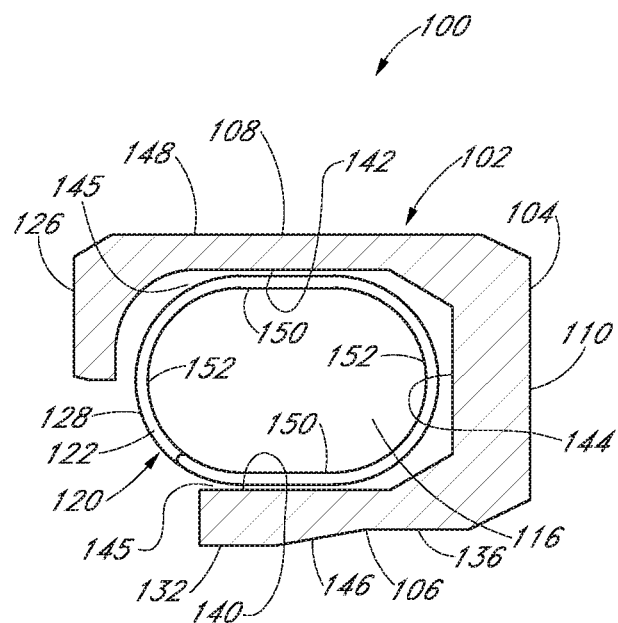
FIG. 1 shows a spring energized seal assembly comprising a sealing element or sealing member with a spring groove or spring cavity having a canted coil spring located therein.

With reference now to FIG. 1, a section of a spring energized seal 100 is shown, which is understood to be annular in configuration and having a sealing element 102 comprising a seal body 104 with an inside flange 106 defining a bore with an inside diameter for receiving a pin or a shaft and an outside flange 108 for pressing against a housing. A center channel section 110 is located between the inside flange 106 and the outside flange 108 and together defining a spring cavity or spring groove 116 having a canted coil spring 120 located therein comprising a plurality of interconnected coils 122 with only one coil shown. The coils 122 of the present canted coil spring 120 are all canted generally along the same canting direction of a coil centerline passing through the center of each coil, which is conventional in the canted coil spring industry. The canted coil spring 120 also has a spring centerline, which passes through the center of the spring ring when the two ends of the spring are connected to form a garter spring. The canted coil spring 120 may be made from a metal material, from a metal alloy, or from a base material with one or more outer metallic layers or coats. The canted coil spring 120 differs from standard extension and compression springs in that these non-canting springs can only elongate or compress along the spring length whereas canted coil springs can cant along a canted direction orthogonal to the coil centerline to make use of different spring characteristics not available in extension and compression springs.

The seal body 104 may be made from an elastomeric material or a thermoplastic elastomer. Any number of prior art seal body materials may be used including polytetrafluoroethylene, PTFE. The outside flange 108 of the sealing element or sealing member 102 is shown with a radial overhang 126, radial relative to the lengthwise axis passing through the bore of the seal body, to close up or close in the opening 128 to the spring cavity 116 thereby making it difficult for the canted coil spring 120 to unintentionally jump out of the spring cavity. However, a radial overhang 126 is not required and can be omitted or shortened. Various corners of the seal body 104 may be optionally be chamfered or radiussed to eliminate sharp corners. In yet other examples, the spring cavity 116 may be modified by changing the length of one or both flanges 106, 108, the thickness of one or both flanges, and/or the height and thickness of the center channel section.

The inside flange 106 is shown with a sealing lip 132, which can be a raised or extended surface extending radially of the base 136 of the inside flange 106 to function as a structure or element that presses against a surface to be sealed, such as a shaft or a pin that rotates or reciprocates about the inside bore defined by the inside flange 106 of the spring energized seal 100. Optionally, the outside flange 108 can also be provided with a sealing lip. The cross-section of the sealing lip 132 can vary to form an elongated line contact with the surface to be sealed or a short line contact with the surface to be sealed. The loading of the sealing lip 132 by the canted coil spring 100 to press against the surface to be sealed can also vary by modifying the contact type between the coils 122 of the canted coil spring 120 and the inside flange surface 140 of the inside flange 106, as further discussed below.

Relative to the spring cavity 116, the inside flange 106 and the outside flange 108 of the seal body 104 both have inside flange surfaces 140, 142 and outside or external flange surfaces 146, 148. In an example, at least one of the two inside flange surfaces 140, 142 can have a generally flat or planar surface. As shown, both the inside and outside flanges 106, 108 of the seal body 104 of FIG. 1 have generally flat or planar surfaces. The inside surface 144 of the center channel section 110 of the seal body 104 may also have a generally planar or flat surface but not necessary. In an example, the inside surface 144 of the center channel section 110 incorporates a surface that is selected to accommodate the shape of a side segment or section of the coils of the canted coil spring, as further discussed below. However, when the coil 122 is spaced from the center channel section 110, the shape of the inside surface 144 is not critical.

As shown in FIG. 1, the coil 122 of the canted coil spring 120 has a coil shape defined by two generally parallel straight segments 150 with a curved or arcuate connecting end or segment 152 at each end joining the two generally parallel straight segments 150 together. The canted coil spring 120 is located inside the spring groove 116 to bias the inside flange 106 and the outside flange 108 away from one another. Although a tiny gap is shown between the two parallel straight segments 150 and the two inside surfaces 140, 142 of the two seal flanges, the gaps are shown to demarcate between the seal body 104 and the canted coil spring 120 to visually aide in the understanding of the two components 102, 120 only but in practice are not there due to the coils 122 contacting and biasing the two flanges 106, 108 away from one another.

Each coil 122 has a coil height CH or shorter of two coil axes, which is generally orthogonal to the seal assembly centerline, or the pin axis when mounted, and a coil width CW or longer of the two coil axes, which is generally parallel to the seal assembly centerline, or the pin axis when mounted and for a radial canted coil spring. As oriented in FIG. 1, the coils 122 of the canted coil spring 120 exert a spring force along the coil height to bias the two flanges 106, 108 away from one another. However, the canted coil spring 120 of the present disclosure can be coiled, such as during turning of a metal wire to form the canted coil spring, to cant along a different axis so that the coils that deflect radially of the coil centerline can be the longer of two axes. Thus, a coil height CH can be longer than a coil width CW and the coils can still deflect along the coil height. Accordingly, in some instances, when called out, the coil height CH can be designated as the shorter of two axes of the coil 122 or the longer of two axes of the coil 122 due to modification of the coils to enable them to deflect or cant along an axis that differs from a traditional axis, such as typically along a coil height or the short of the two axes.

With reference again to FIG. 1, the two straight segments 150 of each coil 122 of the canted coil spring 120 are sized and shaped, such as being configured, to form line contacts 145 with the inside surfaces 140, 142 of the inner flange 106 and the outer flange 108. Due to the two line contacts between the two straight segments 150 and the two generally planar or flat inside surfaces 140, 142 of the two flanges 106, 108, the seal body 104 is properly loaded by the canted coil spring 120. For example, the line contact 145 provides an even load to the inside flange 106 to more evenly distribute the spring or biasing force of the canted coil spring 120 against the sealing lip 132 to seal against the dynamic surface, such as a pin or a shaft. The proper orientation and loading can also increase stability for the canted coil spring within the spring cavity of the sealing element and can prevent the canted coil spring from rolling or tilting, which can cause the loading point to be off of optimal position or reduction of the load on the seal lip. In some examples, only a single straight line contact between the canted coil spring 120 and the seal body 104 is needed to provide stability and reduce possible rolling or tilting. In still other examples, the single line contact 145 between the canted coil spring and the seal body can be along the generally flat or planar inside surface 144 of the center channel section 110.

For the spring energized seal assemblies disclosed herein below, it is understood that where a feature is shown but not expressly described and is otherwise the same or similar to the feature or features expressly described elsewhere, such as above with reference to FIG. 1, the disclosed part or parts shown in all the drawing figures but not expressly described because of redundancy and because knowledge is built on a foundation laid by earlier disclosures may nonetheless be understood to be described or taught by the same or similar features expressly set forth in the text for the embodiments in which the feature or features are described. Said differently, subsequent disclosures of the present application are built upon the foundation of earlier disclosures unless the context indicates otherwise. The disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following connector assemblies incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

Figure 2:
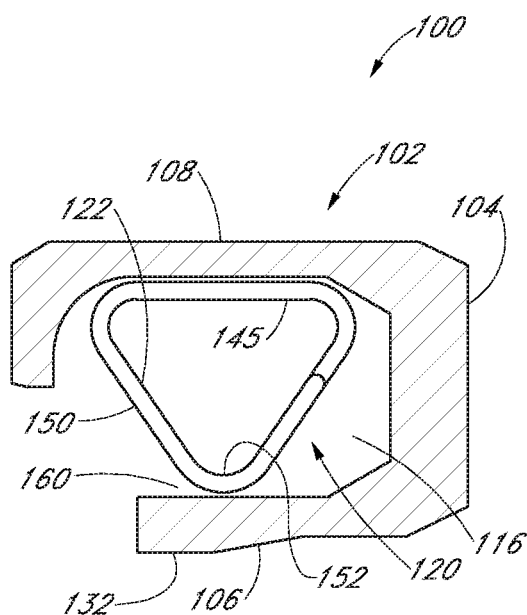
FIG. 2 shows a spring energized seal assembly comprising a sealing element or sealing member with a spring groove or spring cavity having a canted coil spring located therein with an alternative canted coil spring embodiment.

With reference now to FIG. 2, an alternative spring energized seal assembly 100 is shown, which has the same sealing element or sealing member 102 and seal body 104 as that of FIG. 1 but with an alternative canted coil spring 120 comprising a plurality of coils 122 (only one shown). In the present embodiment, the coils 122 of the plurality of canted coil spring 120 each comprises three generally straight coil segments 150 connected to one another by curved or arcuate connecting ends 152 forming a polygonal shape coil 122, in particular a triangular shape coil resembling an equilateral triangle with curved connecting ends 152. In the present embodiment, only one straight coil segment 150 forms a line contact 145 with the inside flange surface 142 of the outside flange 108. In other examples, the coils 122 of the canted coil spring 120 can be coiled differently so that the one straight coil segment 150 forms a line contact with the inside flange surface 140 of the inside flange 106.

In the embodiment of FIG. 2, the single straight line contact 145 between the canted coil spring 120 and the seal body 104 of the sealing element 102, in particular the inside surface 142 of the outside flange 108, provides stability and reduces possible rolling or tilting of the coils within the spring cavity 116. The curved or arcuate connecting end 152 of the coil 122 biasing against the inside flange surface 140 of the inside flange 106 forms an extended point contact 160 with the inside flange. The extended point contact 160 can concentrate the biasing force of each coil 122 of the plurality of coils 122 to a smaller area of the inside flange 106 to increase the pressure at the sealing point of the contact. For example, where high sealing contact with a shaft is desired, an extended point contact 160 may be utilized. Further, the position or location of the curved connecting end 152 acting against the inside surface of the inside flange can be shifted left or right along the spring axis, e.g., relative to the viewing angle of FIG. 2, by changing the lengths of the straight segments and the curvature of the curved connecting ends 152. Thus, the present spring energized seal 100 is understood to have one line contact 145 and one extended point contact 160 between the sealing element 102 and the individual coils 122 of the canted coil spring 120 located in the spring cavity 116 of the sealing element or sealing member.

As used herein, a straight line contact is a contact formed between a straight segment 150 of a coil 122 and a generally planar or straight surface of a seal body 104, such as a surface on the inside flange 106 or the outside flange 108 of the seal body. An extended point contact is a contact formed between a curved component, such as a curved or arcuate connecting end 152 or a curved side segment 188 (FIG. 15), of a coil 122 and a surface of a seal body, such as a surface on the inside flange 106 or the outside flange 108 of the seal body. Extended point contacts can form from a sharp bend or a more gradual bend on the coil. A line contact can form from a straight section or segment of a coil that is about 25%, such as 22%, 25%, 27%, or more of the coil width up to 100% of the straight segment.

Figure 3:
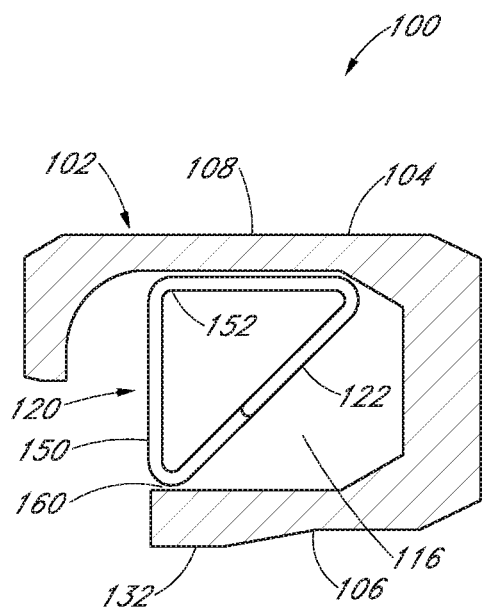
FIG. 3 shows a spring energized seal assembly comprising a sealing element with a spring groove or spring cavity having a canted coil spring located therein with another alternative canted coil spring embodiment.

FIG. 3 shows an alternative spring energized seal assembly 100 with the same sealing element or sealing member 102 and seal body 104 as that of FIG. 1 but with an alternative canted coil spring 120 comprising a plurality of coils 122 (only one shown). The present canted coil spring 120 has coils that are polygonal in shape, such as triangular in shape and in particular a right angled triangle. The coil 122 has three straight segments 150 connected to one another by three curved or arcuate connecting ends 152. One of the straight segments 150 is shown forming a line contact 145 with the inside flange surface 142 of the outside flange 108 and one of the curved or arcuate connecting ends 152 form an extended point contact 160 with the inside flange surface 140 of the inside flange 106. However, as alluded to above, the coils 122 can be coiled differently so that the line contact is with the inside flange 106 and the extended point contact is with the outside flange 108. Further, compared to the spring energized seal 100 of FIG. 2, the location of the extended point contact 160 with the inside flange 106 has been shifted to contact a different location of the inside flange to focus the sealing pressure along a different section of the inside flange. The contact location of the arcuate connecting end 152 and the inside flange 106 can therefore be shifted by changing the triangular shape of the coil 122, such as the lengths of one or more segments and the curvature of the curved connecting ends, to change the location of the extended point contact 160 contacting the inside flange. Thus, the present spring energized seal 100 is understood to have one line contact 145 and one extended point contact 160 between the sealing element 102 and the individual coils 122 of the canted coil spring 120 located in the spring cavity 116 of the sealing element.

Figure 4:
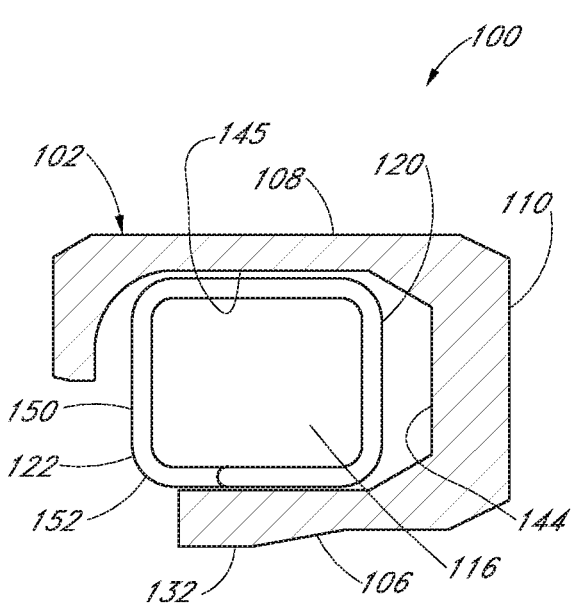
FIG. 4 shows a spring energized seal assembly comprising a sealing element with a spring groove or spring cavity having a canted coil spring located therein with another alternative canted coil spring embodiment.

FIG. 4 shows an alternative spring energized seal assembly 100 with the same sealing element 102 and seal body 104 as that of FIG. 1 but with an alternative canted coil spring 120 comprising a plurality of coils 122 (only one shown). The coils 122 of the canted coil spring 120 of FIG. 4 have a polygonal shape, in particular a generally square shape coil with four generally straight coil segments 150 connected to one another by four arcuate or curved connecting ends 152. Each coil 122 has two line contacts 145 with the seal body 104, one with the inside surface of the inside flange 106 and one with inside surface of the outside flange 108. A third line contact can be incorporated by placing one of the other straight segments 150 of the coil 122 in contact with the inside surface 144 of the center channel section 110 of the seal body 104. Thus, the present spring energized seal 100 is understood to have two line contacts 145 between the sealing element 102 and the individual coils 122 of the canted coil spring 120 located in the spring cavity 116 of the sealing element.

Figure 5:
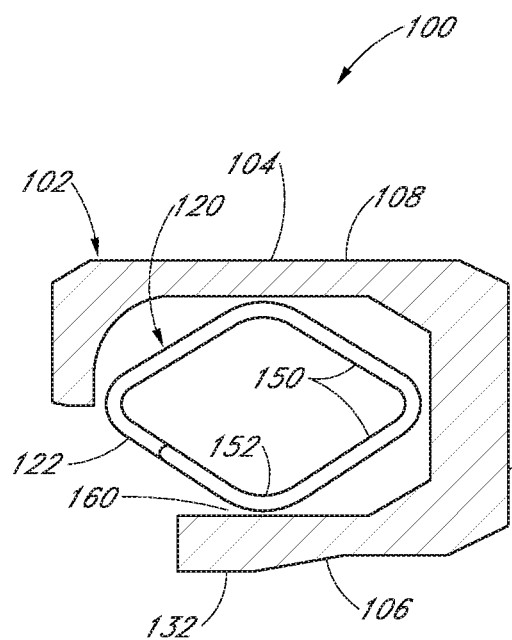
FIG. 5 shows a spring energized seal assembly comprising a sealing element with a spring groove or spring cavity having a canted coil spring located therein with another alternative canted coil spring embodiment.

FIG. 5 shows an alternative spring energized seal assembly 100 with the same sealing element or sealing member 102 and seal body 104 as that of FIG. 1 but with an alternative canted coil spring 120 comprising a plurality of coils 122 (only one shown). The coils 122 of the canted coil spring 120 of FIG. 5 have a polygonal shape, in particular a rhombus shape with four generally straight coil segments 150 connected to one another by four arcuate or curved connecting ends 152. Each coil 122 forms two extended point contacts 160 with the seal body 104, one with the inside surface of the inside flange 106 and one with the inside surface of the outside flange 108. Thus, the present spring energized seal 100 is understood to have two extended point contacts 160 between the sealing element 102 and the individual coils 122 of the canted coil spring 120 located in the spring cavity 116 of the sealing element. The present embodiment demonstrates that a four sided coil 122 of a canted coil spring can be arranged to have two extended point contacts 160 between the sealing element 102 and the individual coils 122 of the canted coil spring 120 but no line contact.

Figure 6:
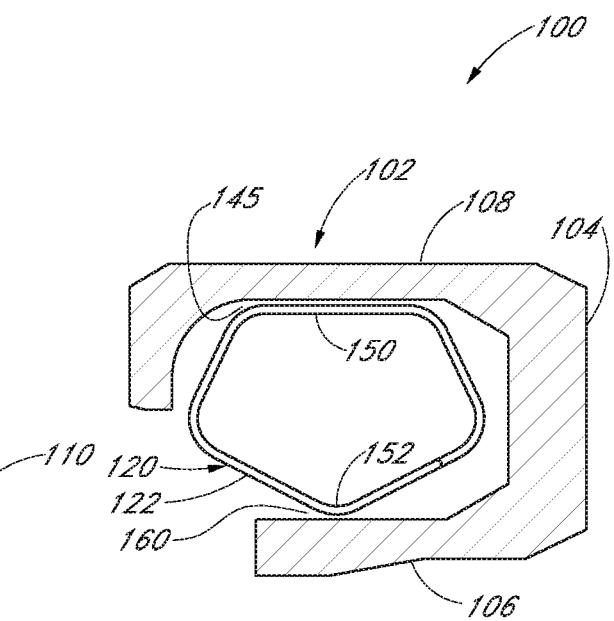
FIG. 6 shows a spring energized seal assembly comprising a sealing element with a spring groove or spring cavity having a canted coil spring located therein with another alternative canted coil spring embodiment.

FIG. 6 shows an alternative spring energized seal assembly 100 with the same sealing element 102 and seal body 104 as that of FIG. 1 but with an alternative canted coil spring 120 comprising a plurality of coils 122 (only one shown). The coils 122 of the canted coil spring 120 of FIG. 6 have a polygonal shape, in particular a pentagon shape with five generally straight coil segments 150 connected to one another by five arcuate or curved connecting ends 152. None of the straight segments 150 of the coil is parallel with any other straight segment. In other examples, at least two of the straight segments can be parallel. One of the straight segments 150 is shown forming a line contact 145 with the inside flange surface 142 of the outside flange 108 and one of the curved or arcuate connecting ends 152 forms an extended point contact 160 with the inside flange surface 140 of the inside flange 106. In some examples, the coils 122 can be coiled differently so that the line contact is with the inside flange 106 and the extended point contact is with the outside flange 108. Further, compared to the spring energized seal 100 of FIG. 2, the location of the extended point contact 160 with the inside flange 106 can be shifted to contact a different location of the inside flange to focus the sealing pressure along a different section of the inside flange. The contact location of the arcuate connecting end 152 and the inside flange 106 can therefore be shifted by changing the lengths of the straight segments 150 and the shapes of the curved connecting ends 152. Thus, the present spring energized seal 100 is understood to have one line contact 145 and one extended point contact 160 between the sealing element 102 and the individual coils 122 of the canted coil spring 120 located in the spring cavity 116 of the sealing element.

Figure 7:
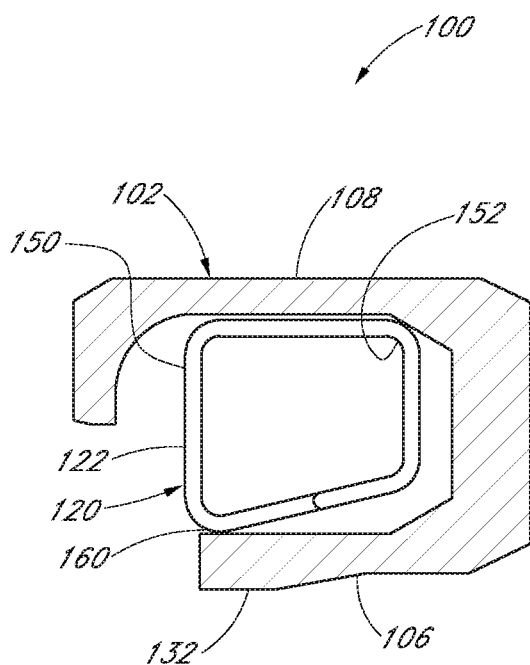
FIG. 7 shows a spring energized seal assembly comprising a sealing element with a spring groove or spring cavity having a canted coil spring located therein with another alternative canted coil spring embodiment.

FIG. 7 shows an alternative spring energized seal assembly 100 with the same sealing element or sealing member 102 and seal body 104 as that of FIG. 1 but with an alternative canted coil spring 120 comprising a plurality of coils 122 (only one shown). The coils 122 of the canted coil spring 120 of FIG. 7 have a polygonal shape, in particular a trapezoid shape with four generally straight coil segments 150, two of the four straight coil segments 150 are generally parallel to one another, and the four straight segments 150 are connected to one another by four arcuate or curved connecting ends 152. One of the straight segments 150 is shown forming a line contact 145 with the inside flange surface 142 of the outside flange 108 and one of the curved or arcuate connecting ends 152 forms an extended point contact 160 with the inside flange surface 140 of the inside flange 106. In some examples, the coils 122 can be coiled differently so that the line contact is with the inside flange 106 and the extended point contact is with the outside flange 108. The present embodiment demonstrates that a four sided coil 122 of a canted coil spring can be arranged to have one line contact 145 and one extended point contact 160 between the sealing element 102 and the individual coils 122 of the canted coil spring 120 located in the spring cavity 116 of the sealing element.

Figure 8:
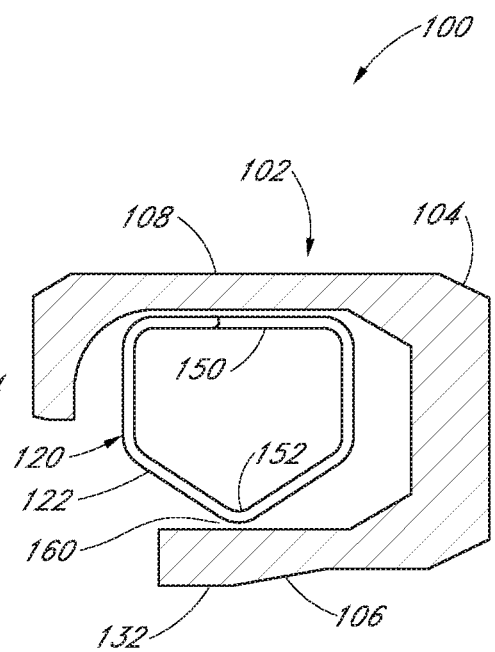
FIG. 8 shows a spring energized seal assembly comprising a sealing element or sealing member with a spring groove or spring cavity having a canted coil spring located therein with another alternative canted coil spring embodiment.

FIG. 8 shows an alternative spring energized seal assembly 100 with the same sealing element 102 and seal body 104 as that of FIG. 1 but with an alternative canted coil spring 120 comprising a plurality of coils 122 (only one shown). The coils 122 of the canted coil spring 120 of FIG. 8 have a polygonal shape, in particular a pentagon shape with five generally straight coil segments 150 connected to one another by five arcuate or curved connecting ends 152. Two of the straight segments 150 are parallel to one another. One of the straight segments 150 is shown forming a line contact 145 with the inside flange surface 142 of the outside flange 108 and one of the curved or arcuate connecting ends 152 forms an extended point contact 160 with the inside flange surface 140 of the inside flange 106. In some examples, the coils 122 can be coiled differently so that the line contact is with the inside flange 106 and the extended point contact is with the outside flange 108. The contact location of the arcuate connecting end 152 and the inside flange 106 can be shifted by changing the lengths of some of the straight segments 150 and the shapes of the curved connecting ends 152 connecting them. Thus, the present spring energized seal 100 is understood to have one line contact 145 and one extended point contact 160 between the sealing element or sealing member 102 and the individual coils 122 of the canted coil spring 120 located in the spring cavity 116 of the sealing element.

FIGS. 9-13 show alternative spring energized seal assemblies 100 each with the same sealing element or sealing member 102 and seal body 104 as that of FIG. 1 but with an alternative canted coil spring 120 comprising a plurality of coils 122 (only one shown) located in the spring cavity 116 of the seal body. The figures show a complex coil shape with coil segments that cross, intersect, and/or form loops within the same coil of the canted coil spring. FIG. 9 in particular shows a cross-sectional view of canted coil spring 120 comprising a plurality of coils 122 (only one shown) each with a non-elliptical and non-rectangular shape. As shown, the coil 122 has a star-shaped geometry with the wire of the canted coil spring following a pentagram pattern. The coil 122 has a plurality of straight segments 150 connected to one another by curved connecting ends 152. Due to the unique cross-sectional shape of the canted coil spring 120, the number of contact points between the seal body 104 and the canted coil spring 120 include three extended point contacts 160, two at the inside flange surface of the outside flange 108 and one at the inner flange surface of the inside flange 106. The two spaced apart extended point contacts with the outside flange provides stability and resists spring rolling or tilting. In some examples, the coils 122 can be coiled differently so that the two extended point contacts is with the inside flange 106 and the single extended point contact is with the outside flange 108.

FIG. 10 shows a canted coil spring 120 comprising a plurality of coils 122 (only one shown) located in a spring cavity 116 of the seal body 104. The coil 122 has generally parallel straight segments 150 joined by curved connecting ends 152 and arranged in a "T" shape. The coil 122 can be viewed as having two similar coil sub-sections that are turned relative to one another to form the "T" shape. The coil 122 is non-elliptical and non-rectangular in shape. One of the straight segments 150 is shown forming a line contact 145 with the inside flange surface 142 of the outside flange 108 and one of the curved or arcuate connecting ends 152 form an extended point contact 160 with the inside flange surface 140 of the inside flange 106. In some examples, the coils 122 can be coiled differently so that the line contact is with the inside flange 106 and the extended point contact is with the outside flange 108. Further, compared to the spring energized seal 100 of FIG. 2, the location of the extended point contact 160 with the inside flange 106 can be shifted to contact a different location of the inside flange to focus the sealing pressure along a different section of the inside flange. The contact location of the arcuate connecting end 152 and the inside flange 106 can therefore be shifted by changing the "T" shape configuration. Thus, the present spring energized seal 100 is understood to have one line contact 145 and one extended point contact 160 between the sealing element or sealing member 102 and the individual coils 122 of the canted coil spring 120.

FIG. 11 shows a canted coil spring 120 comprising a plurality of coils 122 (only one shown) located in a spring cavity 116 of the seal body 104. The coil 122 of the canted coil spring 120 of FIG. 11 is non-elliptical and non-rectangular in shape. The "X" shape of the coil 122 is formed by connecting a plurality of straight segments 150 with curved connecting ends 152 to provide a wide working range of deflection. The "X" shape of the coil 122 provides multiple spaced apart extended point contacts with the inside and outside flanges 106, 108 of the sealing element 102. In the example shown, two spaced apart extended point contacts are provided at the inside flange surface of the outside flange and two spaced apart extended point contacts are provided at the inside flange surface of the inside flange.

FIG. 12 shows a canted coil spring 120 with a plurality of coils 122 (only one shown) located in a spring cavity 116 and each coil with multi-loops and each coil with a geometry that resembles a three-leaf clover. Said multi-loop geometry comprises multiple tear drop shaped loops 170 each with a curved connecting end 152 joining straight segments 150 together. The tear drop shaped loops converge at common internal point or location 172. Due to the unique cross-sectional shape of the canted coil spring, multiple spaced apart extended point contacts with the inside and outside flanges 106, 108 of the sealing element 102 are formed or provided. In the example shown, two spaced apart extended point contacts are provided at the inside flange surface of the outside flange and one extended point contact is provided at the inside flange surface of the inside flange. In some examples, the coils 122 can be coiled differently so that the two extended point contacts is with the inside flange 106 and the single extended point contact is with the outside flange 108.

Figure 13:
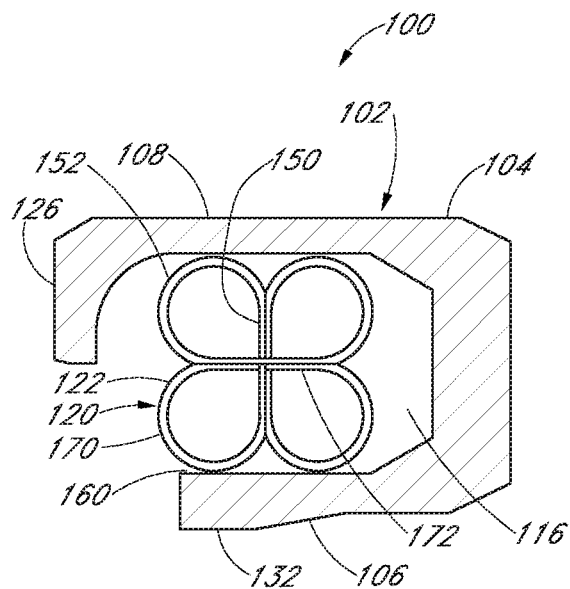
FIG. 13 shows a spring energized seal assembly comprising a sealing element with a spring groove or spring cavity having a canted coil spring located therein with another alternative canted coil spring embodiment.

FIG. 13 shows cross-sectional view of a canted coil spring 120 with a plurality of coils 122 (only one shown) located in a spring cavity 116 and each coil with multi-loops and each coil with a geometry that resembles a four-leaf clover. Said multi-loop geometry comprises four loops 170 each with a curved connecting end 152 joining straight segments 150 together. The loops converge at common internal point or location 172 and have common straight segments 150 when viewing along a cross-sectional profile. Due to the unique cross-sectional shape of the canted coil spring, multiple spaced apart extended point contacts with the inside and outside flanges 106, 108 of the sealing element 102 are provided. In the example shown, two spaced apart extended point contacts are provided at the inside flange surface of the outside flange 108 and two extended point contacts are provided at the inside flange surface of the inside flange 106.

Figure 14:
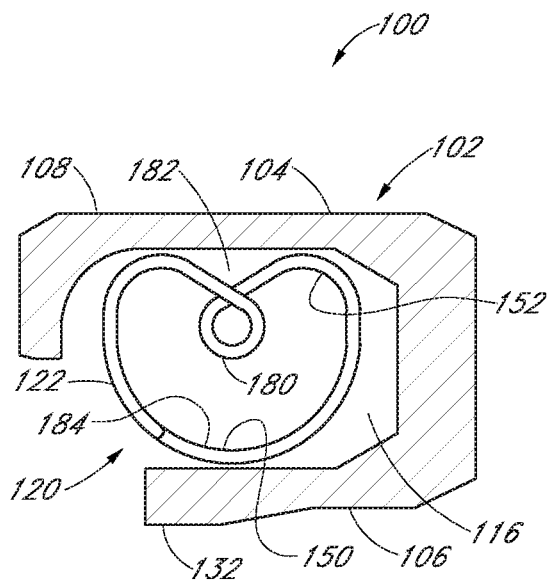
FIG. 14 shows a spring energized seal assembly comprising a sealing element with a spring groove or spring cavity having a canted coil spring located therein with another alternative canted coil spring embodiment.

FIG. 14 shows an alternative spring energized seal assembly 100 with the same sealing element or sealing member 102 and seal body 104 as that of FIG. 1 but with an alternative canted coil spring 120 comprising a plurality of coils 122 (only one shown) located in a spring cavity 116. The coil 122 of the plurality of coils of the canted coil spring 120 has a plurality of non-elliptical and nonrectangular shape coils each comprising at least one interior loop 180 that is located or arranged entirely within an outer contour of the cross-sectional profile of the coil 122. The loop 180 forms a dimple 182 on one of the sides of the coil 122 located between two curved connecting ends 152 to form two spaced apart curved ends or spaced apart projections to provide two extended point contacts 160 with the inside surface of the outside flange 108. The coil 122 also has a section 184 that can embody a straight segment 150 to form a line contact with the inside surface of the inside flange 106 or can be curved to form an extended point contact with the inside flange. In some examples, the curved side segment 184 can include a straight section that is about 25% of the coil width to thereby form a line contact with the inside flange 106. Due to the canted coil spring's multi-contact design, the canted coil spring of the present embodiment is able to maintain its position with little to no spring rolling or tilting within the spring cavity. In some examples, the coils 122 of FIG. 14 can be coiled differently so that the line contact is with the outside flange 108 and the two extended point contacts formed by the dimple 182 are with the inside flange 106.

Figure 15:
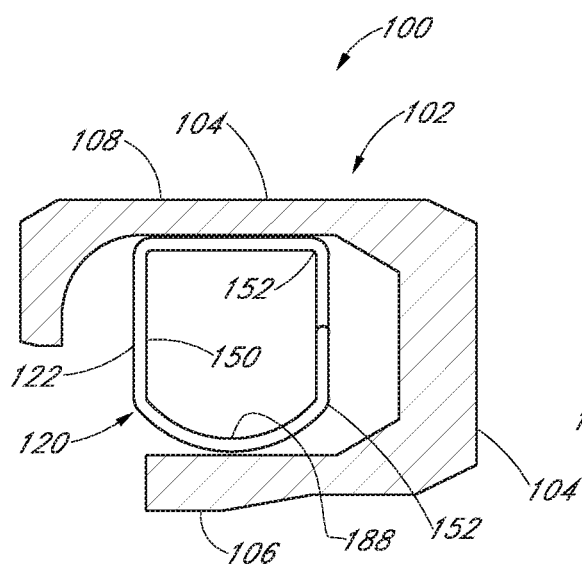
FIG. 15 shows a spring energized seal assembly comprising a sealing element with a spring groove or spring cavity having a canted coil spring located therein with another alternative canted coil spring embodiment.

FIG. 15 shows an alternative spring energized seal assembly 100 with the same sealing element 102 and seal body 104 as that of FIG. 1 but with an alternative canted coil spring 120 comprising a plurality of coils 122 (only one shown) located in a spring cavity 116. The coils 122 of the canted coil spring 120 of FIG. 15 have a polygonal shape with three generally straight coil segments 150 with two of the three straight coil segments 150 being generally parallel to one another but with a fourth segment 188 being generally curved or arcuate, such as an arcuate or curved side segment 188, to form a shape that is similar to a loaf of bread. The straight segments 150 are connected to one another by four arcuate or curved connecting ends 152. One of the straight segments 150 is shown forming a line contact 145 with the inside flange surface 142 of the outside flange 108 and the curved side segment 188 forms an extended point contact 160 with the inside flange surface 140 of the inside flange 106. In some examples, the coils 122 can be coiled differently so that the line contact is with the inside flange 106 and the extended point contact is with the outside flange 108. The present embodiment demonstrates that a four sided coil 122 of a canted coil spring can be arranged to have one line contact 145 and one extended point contact 160 between the sealing element 102 and the individual coils 122 of the canted coil spring 120. In some examples, the curved side segment 188 can include a straight section that is about 25% of the coil width to thereby form a line contact with the inside flange. In some examples, the curved side segment 188 can include a dimple, as shown with reference to FIG. 16

Figure 16:
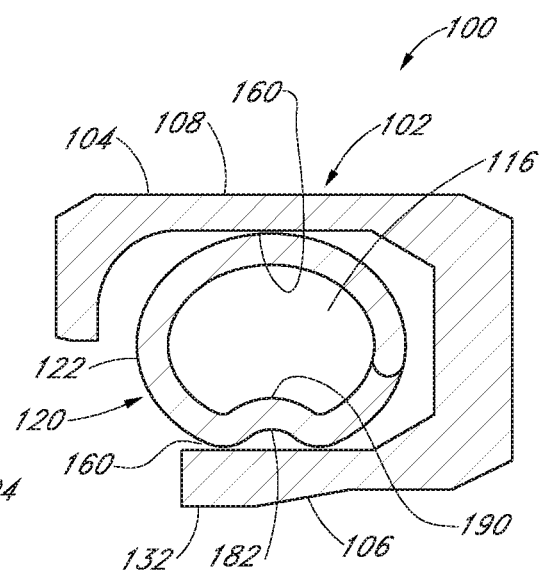
FIG. 16 shows a spring energized seal assembly comprising a sealing element or sealing member with a spring groove or spring cavity having a canted coil spring located therein with another alternative canted coil spring embodiment.

FIG. 16 shows an alternative spring energized seal assembly 100 with the same sealing element or sealing member 102 and seal body 104 as that of FIG. 1 but with an alternative canted coil spring 120 comprising a plurality of coils 122 (only one shown) located in a spring cavity 116. The coil 122 of FIG. 16 is generally elliptical and has a major axis and a minor axis and a dimple 182 formed on the coil 122 to create an inward arc section 190 to thereby form two spaced apart curved ends or spaced apart projections to provide two extended point contacts 160 with the inside flange 106. In some examples, the coils 122 can be coiled differently so that the dimple 182 and the inward arc section 190 are located to contact the outside flange 108. Thus, the present spring energized seal 100 is understood to have at least three extended point contacts 160 between the sealing element 102 and the individual coils 122 of the canted coil spring 120. The three extended point contacts can be incorporated without the coil having any straight segment.

FIG. 17 shows an alternative spring energized seal assembly 100 with the same sealing element 102 and seal body 104 as that of FIG. 1 but with an alternative canted coil spring 120 comprising a plurality of coils 122 (only one shown) located in a spring cavity 116. The coil 122 of FIG. 17 is generally elliptical and has a major axis and a minor axis and two dimples 182 formed on the coil 122 to create two inward arc sections 190 to thereby form two extended point contacts 160 with the inside flange 106 and two extended point contacts with the outside flange 108. Thus, the present spring energized seal 100 is understood to have four extended point contacts 160 between the sealing element 102 and the individual coils 122 of the canted coil spring 120. The four extended point contacts can be incorporated without the coil having any straight segment.

FIG. 18 shows an alternative spring energized seal assembly 100 with similar sealing element or sealing member 102, seal body 104, and canted coil spring 120 comprising a plurality of coils 122 (only one shown) as that of FIG. 8 located in a spring cavity 116. In the present embodiment, the inside surface 140 of the inside flange 106 is provided with a dimple 196. Where a seal body has multiple extended point contacts, multiple dimples 196 may be provided to accommodate each curved connecting end or curved side segment. The dimple 196 is sized, shaped and arranged to receive a curved connecting end 152 or a curved side segment 188 (FIG. 15) of a coil to thereby form an engagement between the coil and the seal body 104 of the sealing element 102. In particular, the dimple 196 is configured to engage the curved connecting end 152 or a curved side segment 188 (FIG. 15) of a coil of the plurality of coils 122 of the canted coil spring 120. The orientation and loading provided by the canted coil spring 120 of FIG. 18 to the seal body 104 increase stability of the canted coil spring within the spring cavity sealing element and can prevent the canted coil spring from rolling or tilting, which can cause the loading point to be off of optimal position or reduction of the load on the seal lip. Additionally, the engagement between the dimple 196 of the inside flange 106 and the curved connecting end 152 of the coil 122 ensures optimum alignment and further resists movement of the canted coil spring within the spring cavity 116.

FIG. 19 shows an alternative spring energized seal assembly 100 with similar sealing element 102 and seal body 104 as that of FIGS. 1 and 18 and with a canted coil spring with a plurality of coils 122 (only one shown) as that of FIG. 10 located in a spring cavity 116. In the present embodiment, the inside surface 140 of the inside flange 106 is provided with a dimple 196. The dimple 196 is sized, shaped and arranged to receive a curved connecting end 152 of the coil 122 to thereby form an engagement between the coil and the seal body of the sealing element or sealing member. In particular, the dimple 196 is configured to engage the curved connecting end 152 of each coil of the plurality of coils 122 of the canted coil spring 120. The orientation and loading provided by the canted coil spring 120 of FIG. 19 to the seal body increase stability of the canted coil spring within the spring cavity of the sealing element and can prevent the canted coil spring from rolling or tilting, which can cause the loading point to be off of optimal position or reduction of the load on the seal lip. Additionally, the engagement between the dimple 196 of the inside flange 106 and the curved connecting end 152 of the coil 122 ensures optimum alignment and further resists movement of the canted coil spring within the spring cavity 116.

Figure 20:
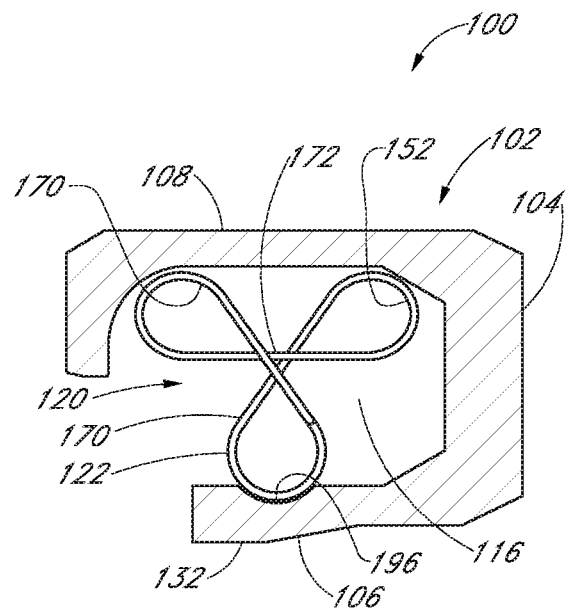
FIG. 20 shows a spring energized seal assembly comprising a sealing element or sealing member with a spring groove or spring cavity having a canted coil spring located therein engaging a dimple on the sealing element with another alternative canted coil spring embodiment.

FIG. 20 shows an alternative spring energized seal assembly 100 with similar sealing element 102 and seal body 104 as that of FIGS. 1 and 18 and with a canted coil spring with a plurality of coils 122 (only one shown) as that of FIG. 12 located in a spring cavity 116. In the present embodiment, the inside surface 140 of the inside flange 106 is provided with a dimple 196. The dimple 196 is sized, shaped and arranged to receive a curved end 152 of a tear drop loop 170 of the coil 122 to thereby form an engagement between the coil and the seal body of the sealing element or sealing member. In particular, the dimple 196 is configured to engage the tear drop loops 170 of the coils 122 of the canted coil spring 120. The orientation and loading provided by the canted coil spring 120 of FIG. 20 to the seal body increase stability of the canted coil spring within the spring cavity of the sealing element and can prevent the canted coil spring from rolling or tilting, which can cause the loading point to be off of optimal position or reduction of the load on the seal lip. Additionally, the engagement between the dimple 196 of the inside flange 106 and the tear drop loop of the coil 122 ensures optimum alignment and further resists movement of the canted coil spring within the spring cavity 116.

Figure 21:
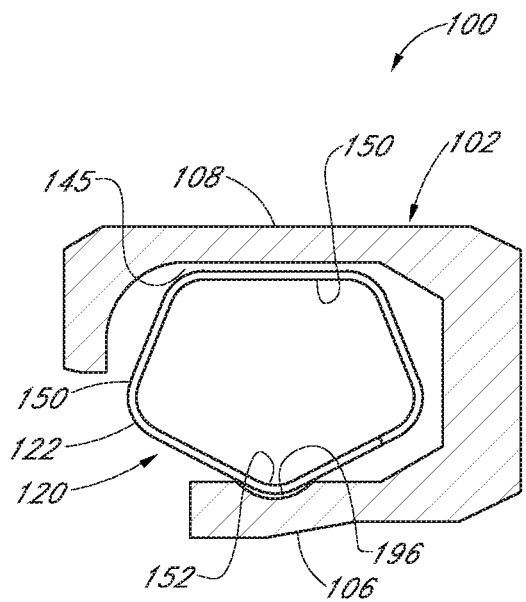
FIG. 21 shows a spring energized seal assembly comprising a sealing element with a spring groove or spring cavity having a canted coil spring located therein engaging a dimple on the sealing element with another alternative canted coil spring embodiment.

FIG. 21 shows an alternative spring energized seal assembly 100 with similar sealing element 102 and seal body 104 as that of FIGS. 1 and 18 and with a canted coil spring with a plurality of coils 122 (only one shown) as that of FIG. 6 located in a spring cavity 116. In the present embodiment, the inside surface 140 of the inside flange 106 is provided with a dimple 196. The dimple 196 is sized, shaped and arranged to receive a curved connecting end 152 of the coil 122 to thereby form an engagement between the coil and the seal body of the sealing element or sealing member. In particular, the dimple 196 is configured to engage the curved connecting end 152 of each coil of the plurality of coils 122 of the canted coil spring 120. The orientation and loading provided by the canted coil spring 120 of FIG. 21 to the seal body increase stability of the canted coil spring within the spring cavity of the sealing element and can prevent the canted coil spring from rolling or tilting, which can cause the loading point to be off of optimal position or reduction of the load on the seal lip. Additionally, the engagement between the dimple 196 of the inside flange 106 and the curved connecting end 152 of the coil 122 ensures optimum alignment and further resists movement of the canted coil spring within the spring cavity 116.

Figure 22:
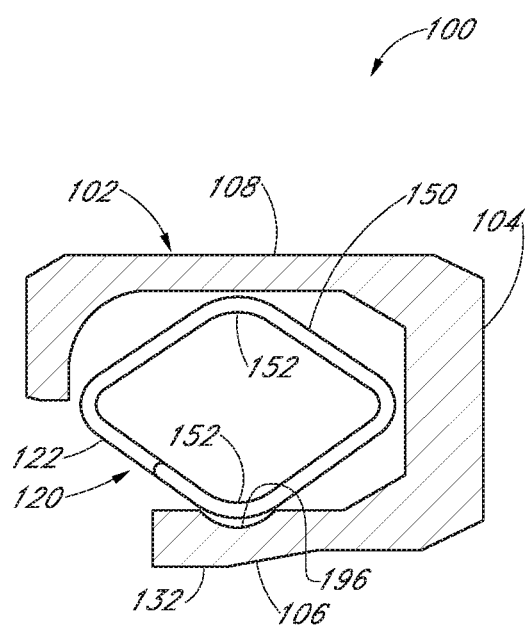
FIG. 22 shows a spring energized seal assembly comprising a sealing element or sealing member with a spring groove or spring cavity having a canted coil spring located therein engaging a dimple on the sealing element with another alternative canted coil spring embodiment.

FIG. 22 shows an alternative spring energized seal assembly 100 with similar sealing element 102 and seal body 104 as that of FIGS. 1 and 18 and with a canted coil spring with a plurality of coils 122 (only one shown) as that of FIG. 5 located in a spring cavity 116. In the present embodiment, the inside surface 140 of the inside flange 106 is provided with a dimple 196. The dimple 196 is sized, shaped and arranged to receive a curved connecting end 152 of the coil 122 to thereby form an engagement between the coil and the seal body of the sealing element. In particular, the dimple 196 is configured to engage connecting ends 152 of the coils 122 of the canted coil spring 120. The orientation and loading provided by the canted coil spring 120 of FIG. 22 to the seal body increase stability of the canted coil spring within the spring cavity of the sealing element and can prevent the canted coil spring from rolling or tilting, which can cause the loading point to be off of optimal position or reduction of the load on the seal lip. Additionally, the engagement between the dimple 196 of the inside flange 106 and the curved connecting end 152 of the coil 122 ensures optimum alignment and further resists movement of the canted coil spring within the spring cavity 116.

Figure 23:
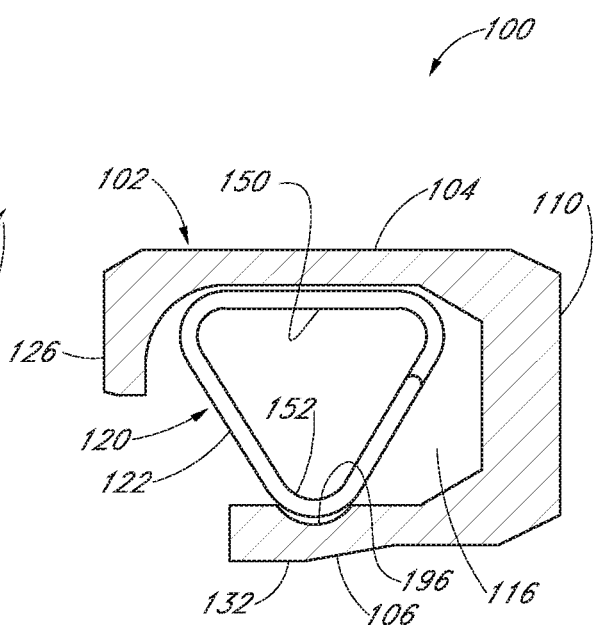
FIG. 23 shows a spring energized seal assembly comprising a sealing element with a spring groove or spring cavity having a canted coil spring located therein engaging a dimple on the sealing element with another alternative canted coil spring embodiment.

FIG. 23 shows an alternative spring energized seal assembly 100 with similar sealing element or sealing member 102 and seal body 104 as that of FIGS. 1 and 18 and with a canted coil spring with a plurality of coils 122 (only one shown) as that of FIG. 5 located in a spring cavity 116. In the present embodiment, the inside surface 140 of the inside flange 106 is provided with a dimple 196. The dimple 196 is sized, shaped and arranged to receive a curved connecting end 152 of the coil 122 to thereby form an engagement between the coil and the seal body of the sealing element. In particular, the dimple 196 is configured to engage connecting ends 152 of the coils 122 of the canted coil spring 120. The orientation and loading provided by the canted coil spring 120 of FIG. 23 to the seal body increase stability of the canted coil spring within the spring cavity of the sealing element and can prevent the canted coil spring from rolling or tilting, which can cause the loading point to be off of optimal position or reduction of the load on the seal lip. Additionally, the engagement between the dimple 196 of the inside flange 106 and the curved connecting end 152 of the coil 122 ensures optimum alignment and further resists movement of the canted coil spring within the spring cavity 116.

Figure 24:
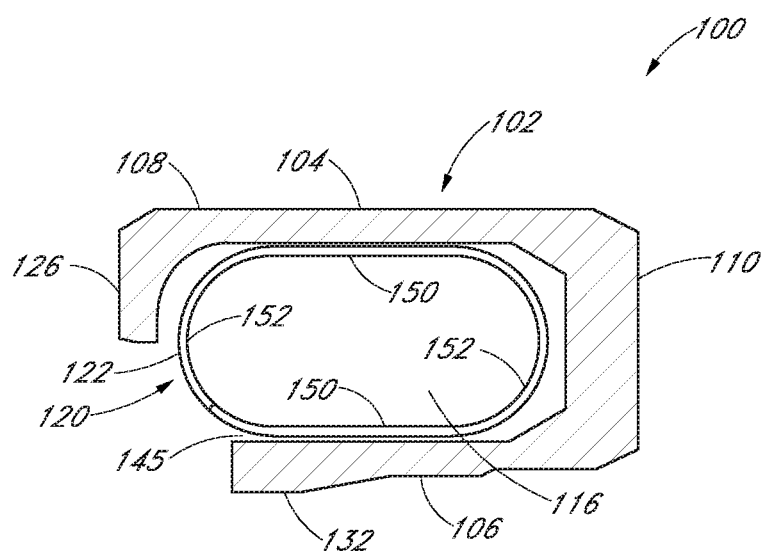
FIG. 24 shows a spring energized seal assembly comprising a sealing element or sealing member with a spring groove or spring cavity having a canted coil spring located therein with another alternative canted coil spring embodiment.

FIG. 24 shows an alternative spring energized seal assembly 100 with the same sealing element 102 and seal body 104 as that of FIG. 1 but with an alternative canted coil spring 120 comprising a plurality of coils 122 (only one shown) located in a spring cavity 116. The coils 122 of the canted coil spring 120 of FIG. 24 is similar to the coils of FIG. 1 but wherein the straight segments 150 are extended, or are relatively longer. Each coil 122 forms two line contacts 145 with the seal body 104, one with the inside flange 106 and one with the outside flange 108. Thus, the present spring energized seal 100 is understood to have two line contacts 145 between the sealing element or sealing member 102 and the individual coils 122 of the canted coil spring 120.

Figure 25:
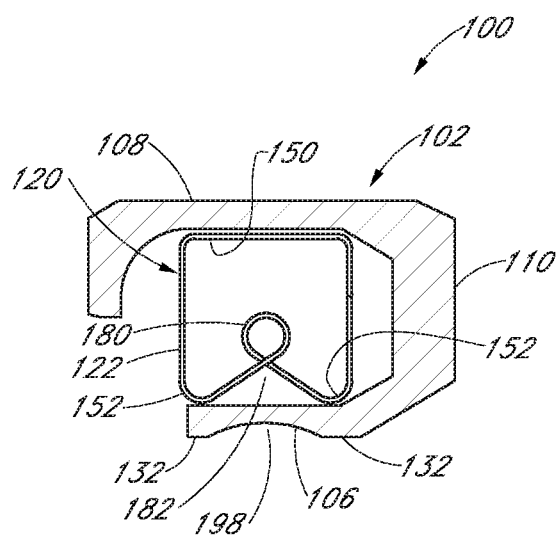
FIG. 25 shows a spring energized seal assembly comprising a sealing element with a spring groove or spring cavity having a canted coil spring located therein and the sealing element having a dimple on an outer surface of the inside flange.

FIG. 25 shows an alternative spring energized seal assembly 100 with similar sealing element 102, seal body 104, and canted coil spring 120 comprising a plurality of coils 122 (only one shown) as that of FIG. 14 located in a spring cavity 116. In the present embodiment, the outside surface 146 of the inside flange 106 is provided with a dimple 198. The dimple 198 is formed to create two spaced apart sealing lips 132 for sealing against a surface, such as a shaft or a pin. The canted coil spring 120 of FIG. 25 is similar to the combination of canted coil springs 120 of FIGS. 14 and 15 in that the coil 122 has a plurality of straight segments 150 connected to one another by curved connecting ends 152 but wherein the curved segment 188 of FIG. 15 has been replaced by an internal loop 180 to form a dimple 182 to thereby create or form two extended point contacts 160 with the inside surface of the inside flange 106. Further, the two curved ends 152 of the coil 122 are sized and shaped to locate over the two sealing lips 132 formed by the dimple 198 on the inside flange. This allows the coils of the single canted coil spring 120 of FIG. 25 to provide two load points against the inside surface of the inside flange to bias the two sealing lips 132 away from the outside flange.

Figure 26:
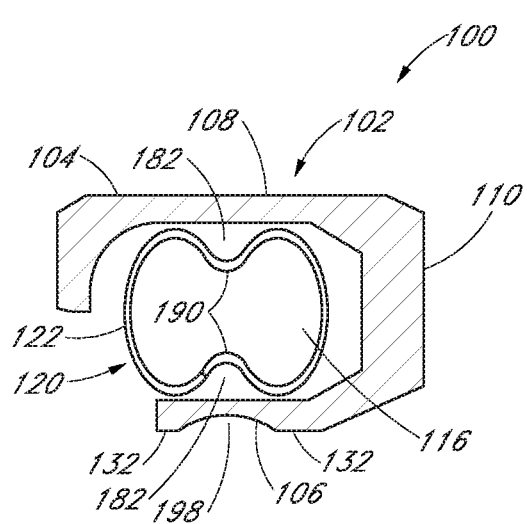
FIG. 26 shows a spring energized seal assembly comprising a sealing element with a spring groove or spring cavity having a canted coil spring located therein and the sealing element having a dimple on an outer surface of the inside flange and with an alternative canted coil spring.

FIG. 26 shows an alternative spring energized seal assembly 100 with similar sealing element 102 and seal body 104 as that of FIG. 25 and similar canted coil spring 120 comprising a plurality of coils 122 (only one shown) of FIG. 17 located in a spring cavity 116. The coil 122 of FIG. 17 is generally elliptical and has a major axis and a minor axis and two dimples 182 formed on the coil 122 to create two inward arc sections 190 to thereby form two spaced apart curved ends or spaced apart projections to provide two extended point contacts 160 with the inside flange 106 and two extended point contacts with the outside flange 108. Further, two curved ends 152 formed by one of the dimples 182 of the coil 122 are sized and shaped to locate over the two sealing lips 132 formed by the dimple 198 on the inside flange 106. This allows the coils of the single canted coil spring 120 of FIG. 26 to provide two load points against the inside surface of the inside flange to bias the two sealing lips 132 away from the outside flange.

Figure 27:
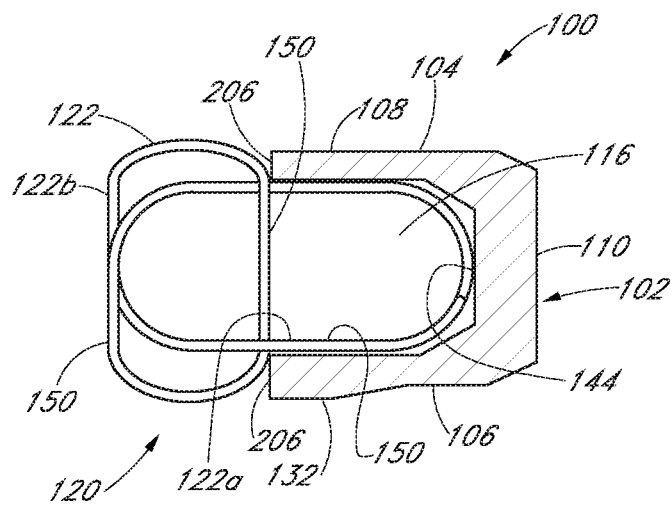
FIG. 27 shows a spring energized seal assembly comprising a sealing element with a spring groove or spring cavity having a canted coil spring located therein and part of the canted coil spring located externally of the spring groove.

FIG. 27 shows an alternative spring energized seal assembly 100 with similar sealing element 102 and seal body 104 as that of FIG. 1 and a canted coil spring 120 comprising a plurality of coils 122 (with only one alternating pair of coils shown) located in a spring cavity 116. In the present embodiment, the sealing element or sealing member 102 has a seal bod 104 with an inside flange 106, an outside flange 108, and a center channel section 110 collectively defining a spring cavity 116. The inside flange has a sealing lip 132 like the sealing element of FIG. 1. However, unlike the seal body of FIG. 1, the outside flange 108 is without a radial overhang. The outside flange can optionally include a sealing lip. The canted coil spring 120 of FIG. 27 has a plurality of alternating spring coil types. As shown, the canted coil spring 120 has a first coil 122 located partially within the spring groove 116 and a second coil located externally of the spring groove. For discussion purposes, the first coil 122 that partially projects into the spring groove 116 can be called a flange biasing coil 122a and the second coil that is located externally of the spring groove can be called a seal biasing coil 122b. In an example, the canted coil spring is made of a plurality of flange biasing coils 122a and seal biasing coils 122b that alternate in a one to one ratio or in a different pattern, such as: (a) 122a, 122a, 122b, 122b, etc.; (b) 122a, 122b, 122a, 122b, etc.; (c) 122a, 122a, 122b, 122a, 122a, 122b, etc.; (d) 122a, 122b, 122b, 122a, 122b, 122b, etc.

As shown, the flange biasing coil 122a and the seal biasing coil 122b both have two straight segments 150 that are connected to one another by curved or arcuate connecting ends 152, similar to the coils 122 of FIG. 1 but wherein the two coil types have been rotated, similar to the coils of FIG. 10. Part of the two straight segments 150 of the flange biasing coil 122a are located within the spring cavity 116 and form line contacts 145 with the inside flange surface of the inside flange 106 and the inside flange surface of the outside flange 108. One of the curved connecting ends 152 is shown contacting the inside surface 144 of the center channel section 110. The flange biasing coil 122a is configured to bias the inside and outside flanges away from one another so that when in service, the sealing lip 132 of the inside flange is biased against the surface to be sealed, such as a shaft.

As shown, the seal biasing coil 122b is rotated so that one of the coil's two straight segments 150 is oriented to contact one or both terminal ends 206 of the inside and outside flanges 106, 108 of the seal body. The other one of the two straight segments 150 is oriented to contact part of a gland, housing, or stuffing box or a structure to which the spring energized seal assembly 100 is positioned. For example, one straight segment 150 of the seal biasing coil 122b is configured to push against a stationary housing surface of the environment that the seal assembly 100 is positioned in and the other straight segment 150 is configured to push against one or both terminal ends 206 of the two seal flanges 106, 108. The seal biasing coil 122b is therefore configured to load the seal assembly 100 in the axial direction to bias the seal assembly towards proper position within the seal gland of the equipment to be sealed.

Figure 28:
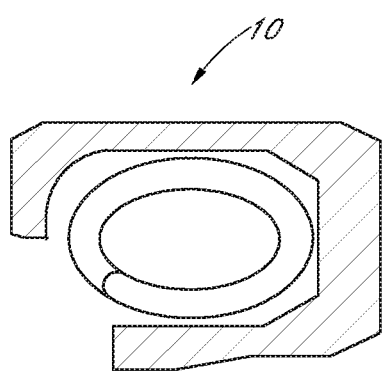
FIG. 28 shows a typical prior art spring energized seal in which the canted coil spring has a plurality of interconnected coils each with an elliptical coil shape.

FIG. 28 shows a conventional spring energized seal assembly 10 comprising a sealing element and a canted coil spring as a point of reference compared to the unique seal assemblies and canted coil springs of the present disclosure.

Figure 29:
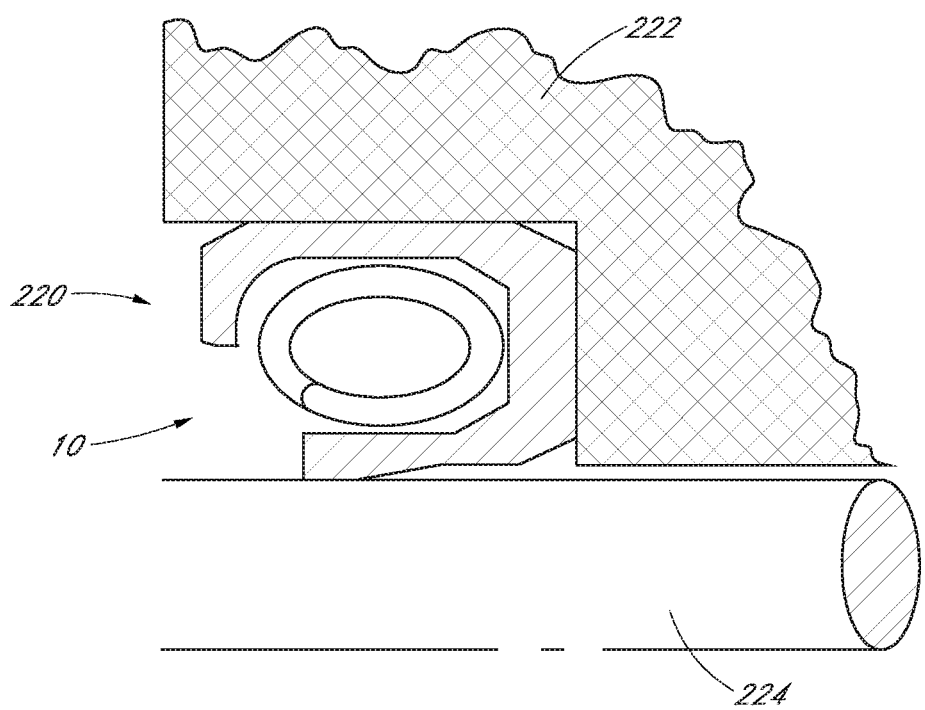
FIG. 29 shows the prior art spring energized seal of FIG. 28 located in a seal gland.

FIG. 29 shows the conventional spring energized seal assembly 10 of FIG. 28 located in a seal gland 220, pushed against a surface of a housing 222, and mounted over a shaft or rod 224. As shown, the outside flange of the conventional seal assembly is biased by the canted coil spring against the housing and the inside flange is biased by the canted coil spring against the shaft 224 to seal the shaft with the seal lip. The various spring energized seal assemblies of the present disclosure, such as with reference to FIGS. 1-26, can be assembled in the seal gland of FIG. 29 in a similar fashion as shown. In some examples, the direction or orientation of the inside and outside flanges 106, 108 can point in a different or opposite direction of the seal assembly 10 shown. In still other examples, the center channel section 110 of the seal assembly can be spaced from the housing 222. In still yet other examples, the seal assemblies of the present disclosure can include a locking ring having a leaf spring to secure the seal body to the housing. Optionally, one or more backing rings can be provided to support the seal body against high pressure extrusion of the seal body material.

The spring energized seal assembly 100 of FIG. 27 can also be installed in a seal gland, similar to that of FIG. 29, but wherein the seal biasing coil 122b of the canted coil spring 120 is placed against a structure of the gland so as to bias the seal assembly 100 axially along the same direction as the shaft or pin.

In some examples, a canted coil spring 120, such as one of the canted coil springs shown and described elsewhere herein, can be incorporated to an outside diameter of a sealing element or sealing member 104, such as to an outside flange 108 of the seal body 104 or to the outside diameter portion of the center channel section. Such utilization of the canted coil spring to the outside diameter of the sealing element can be used in a floating seal application to improve the seal life of the sealing element of the floating seal. For example, the externally mounted canted coil spring 120 can prevent rotation of the sealing element relative to the shaft within the housing while allowing or permitting axial movement of the sealing element along the shaft. The coils of the canted coil spring to be used on the outside diameter of the sealing element can include multiple contact points, such as by incorporating a dimple or a recessed coil segment to produce two or more spring contact segments or apexes, or spaced apart projections. This can increase the surface contact areas and thus friction and can provide stability of the spring in terms of orientation and load direction.

Figure 30:
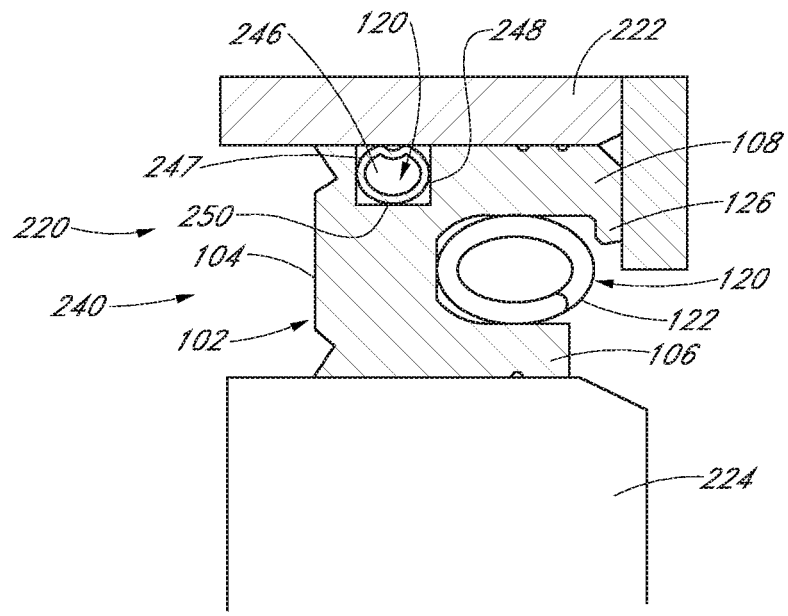
FIGS. 30-32 show alternative spring energized seal assemblies in accordance with further aspects of the invention and wherein each sealing element incorporates a spring groove along an outer diameter for accommodating a second canted coil spring.
Figures 31, 32:
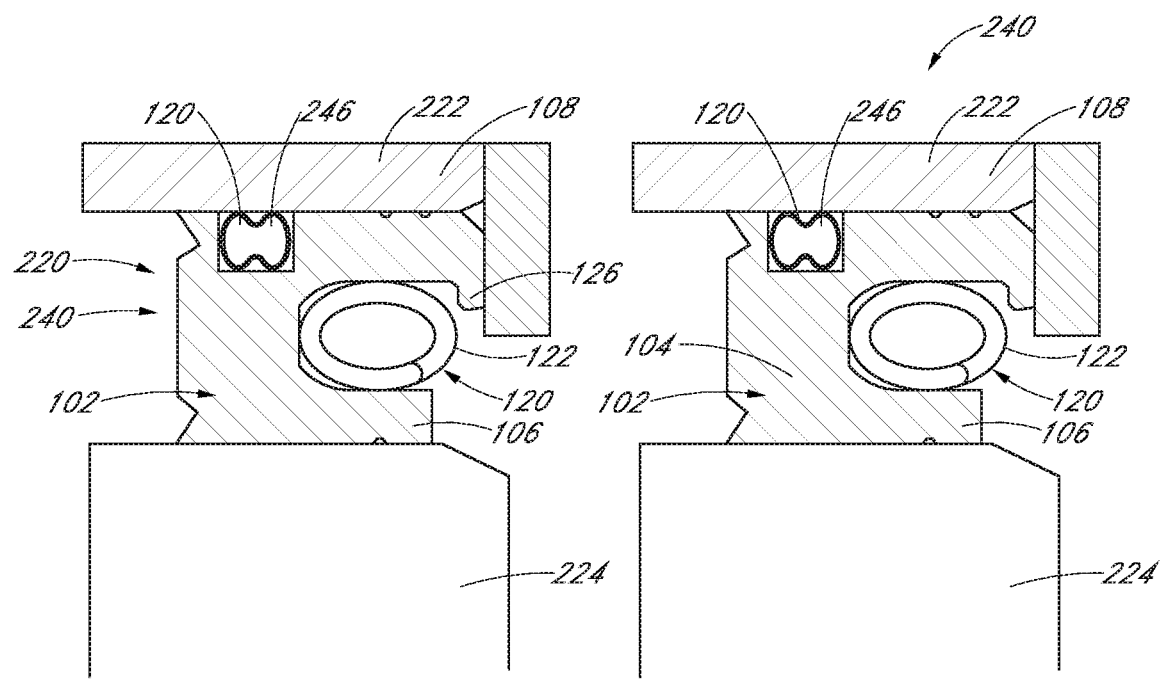

FIGS. 30-32 show alternative spring energized seal assemblies 240 each located inside a seal gland 220 with the inside flange 106 of the seal body 104 biased against the shaft 224 and the outside flange 108 biased against the housing 222. A canted coil spring 120 with a plurality of coils 122 (only one shown) is shown located in a spring cavity 116 defined by the inside flange 106, the outside flange 108, and the center channel section 110. The outside flange 108 is provided with a radial overhang 126. In the present embodiment, each sealing element or sealing member 102 incorporates a spring groove 246 along the outside diameter of the seal body, at or near the center channel section, or at or near the outside flange. The spring groove 246 is formed as a channel along the outside diameter of the seal body 104 and has two sidewalls 247, 248 and a bottom wall 250 located therebetween. Other spring groove shapes are contemplated, including a V-shape groove. The spring groove 246 can be called an outside spring groove. The spring groove 246 is sized and shaped for accommodating a canted coil spring 120. For discussion purposes, the canted coil spring 120 located in the spring groove 116 for biasing the two flanges can be called a first canted coil spring and the canted coil spring 120 located in the spring groove 246 along the outside diameter can be called a second canted coil spring. The second canted coil spring 120 can be incorporated in the spring groove 246 to assist with centering the seal assembly relative to the bore of the seal gland. The first and second canted coil springs can have the same shaped coils or can have different coils. Depending on the size of the spring groove 246 located along the outside diameter of the seal body, the first and second canted coil springs can have the same shape or different shapes but of different overall sizes.

The second canted coil spring 120 located in the spring groove 246 can be any of the various canted coil springs 120 discussed elsewhere herein but sized to fit within the spring groove 246. In some examples, any of the seal assemblies 100 with the various canted coil springs described elsewhere herein, such as the seal assemblies of FIGS. 1-27, can be used as shown in FIGS. 30-32 and wherein the spring groove 246 can be incorporated in the seal body 104 of the seal assemblies of FIGS. 1-27 for accommodating the second canted coil spring 120. In FIG. 30, the second canted coil spring 120 can be similar to the canted coil spring of FIG. 16 with the dimple 182 arranged to face the housing 222. In FIG. 31, the second canted coil spring 120 can be similar to the canted coil spring of FIG. 17, which has two dimples, one arranged to face the housing 222 and one arranged to face the bottom wall 250 of the spring groove 246.

In FIG. 32, the second canted coil spring 120 has a number "8" configuration that is turned, similar to an infinity symbol. The coil with the infinity symbol of FIG. 32 has two lobes or loops per coil and wherein the same two loops per coil can contact both the housing 222 and the bottom wall 250 of the spring groove 246. In some examples, the coil with the infinity symbol can also be used as the first canted coil spring for biasing the inside flange 106 and the outside flange 108 away from one another.

Figure 33:
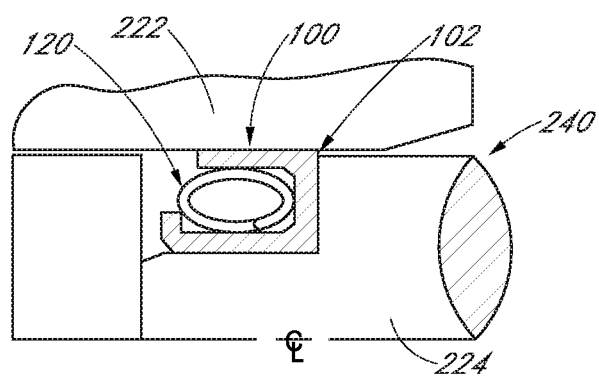
FIG. 33 shows a spring energized seal assembly located in a seal gland and wherein the seal assembly is piston mounted.

FIG. 33 shows a spring energized seal assembly 100 located inside a seal gland 240. In the present embodiment, the seal assembly 100 is piston mounted. That is, the spring energized seal assembly 100 is configured for installation onto the piston 224 and then the combination piston and seal assembly installed into the housing 222. A sealing lip 132 can be provided with both the inside flange 106 and the outside flange 108. In some examples, any of the seal assemblies 100 with various different canted coil springs described elsewhere herein, such as the seal assemblies of FIGS. 1-27, can be used as shown in FIG. 33.

Figure 34:
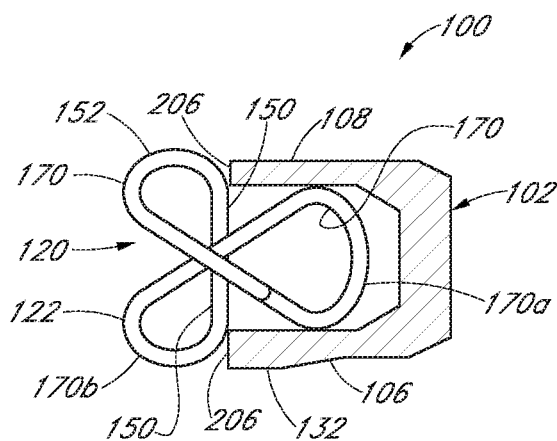
FIG. 34 shows a spring energized seal assembly comprising a sealing element with a spring groove or spring cavity having a canted coil spring located therein and part of the canted coil spring located externally of the spring groove, similar to the embodiment of FIG. 27 but having an alternative canted coil spring.

FIG. 34 shows an alternative spring energized seal assembly 100 with similar sealing element 102 and seal body 104 as that of FIG. 27 and a canted coil spring 120 comprising a plurality of coils 122 (with only one alternating pair of coils shown). In the present embodiment, the sealing element 102 has a seal body 104 with an inside flange, 106, and outside flange 108, and a center channel section 110 defining a spring cavity 116. The inside flange has a sealing lip 132 like the sealing element of FIG. 1. However, unlike the seal body of FIG. 1, the outside flange 108 is without a radial overhang, similar to that of FIG. 27. Also similar to the embodiment of FIG. 27, the coil 122 of the canted coil spring 120 of FIG. 34 has a portion that is located within the seal cavity 116 of the seal body and a portion that is external of the seal body.

FIG. 34 shows a complex coil shape with coil segments that cross, intersect, and/or form loops within the same coil of the canted coil spring, similar to the canted coil spring of FIG. 12. The canted coil spring 120 of FIG. 34 comprises a plurality of coils 122 (only one shown) each with a non-elliptical and non-rectangular shape. The coil 122 has multi-loops and each coil with a geometry that resembles a three-leaf clover. Said multi-loop geometry comprises multiple tear drop shaped loops 170 each with a curved connecting end 152 joining straight segments 150 together. The tear drop shaped loops 170 converge at a common internal point or location 172 when viewing the cross-sectional profile. As shown, one of the tear drop loops 170 is located in the spring cavity 116 to bias the inside flange 106 and the outside flange 108 away from one another. In the example shown, the tear drop loop 170 that biases the two flanges is spaced from the center channel section 110. In other examples, the tear drop loop 170 can be elongated to touch or abut the center channel section.

Two of the tear drop loops 170 are located externally of the spring cavity 116. The two externally located tear drop loops 170 share a common straight segment 150 that is arranged to abut the two terminal ends 206 of the inside flange 106 and of the outside flange 108 of the seal body, similar to that of FIG. 27. For discussion purposes, the loop 170 of the coil 122 that biases the two flanges can be called an internal loop 170a and the two loops 170 that are located externally of the spring cavity can be called external loops 170b.

When the spring energized seal 100 of FIG. 34 is mounted over a shaft or pin and in a seal gland, the internal loop 170a is located in the spring cavity 116 to bias the two seal flanges 106, 108 away from one another and the external loops 170b is oriented to contact part of a gland, housing, or stuffing box or a structure to which the spring energized seal assembly 100 is positioned while the common straight segment 150 is configured to push against one or both terminal ends 206 of the two seal flanges 106, 108. The seal biasing coil external loops 170b are therefore configured to load the seal assembly 100 in the axial direction to bias the seal assembly towards proper position within the seal gland of the equipment to be sealed.

Figure 35:
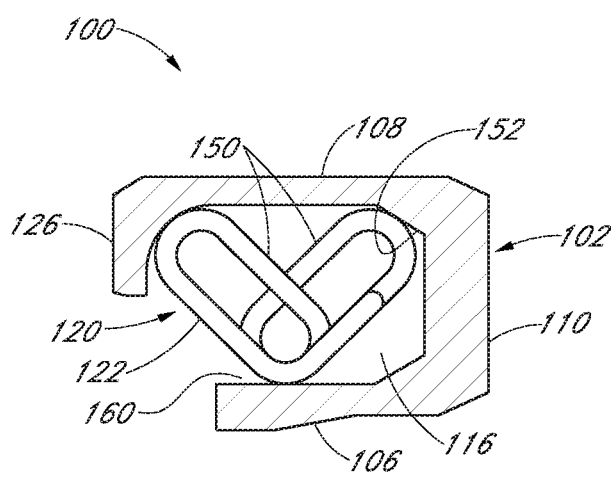
FIG. 35 shows a spring energized seal assembly comprising a sealing element with a spring groove or spring cavity having a canted coil spring located therein with another alternative canted coil spring embodiment.

FIG. 35 shows an alternative spring energized seal assembly 100 with the same sealing element 102 and seal body 104 as that of FIG. 1 but with an alternative canted coil spring 120 comprising a plurality of coils 122 (only one shown). FIG. 35 shows a coil with generally parallel straight segments 150 joined by curved connecting ends 152 and arranged in a "V" shape. The "V" shape configuration allows the coil 122 of the canted coil spring 120 to form three extended point contacts 160 with the inside and outside flanges 106, 108 of the seal body 104. In particular, the coil is shaped so that two curved connecting ends 152 form two extended point contacts 160 with the inside surface of the outside flange 108 and another curved connecting end 152 forms a single extended point contact 160 with the inside surface of the inside flange 106. In some examples, the coils 122 can be coiled differently so that the two extended point contacts 160 are with the inside flange 106 and the single extended point contact 160 is with the outside flange 108. Further, compared to the spring energized seal 100 of FIG. 2, the location of the extended point contact 160 with the inside flange 106 can be shifted to contact a different location of the inside flange to focus the sealing pressure along a different section of the inside flange. The contact location of the arcuate connecting end 152 and the inside flange 106 can therefore be shifted by changing the lengths of the straight segments and the curvature of the connecting ends. Thus, the present spring energized seal 100 is understood to have three extended point contacts 160 between the sealing element 102 and the individual coils 122 of the canted coil spring 120.

Figure 36:
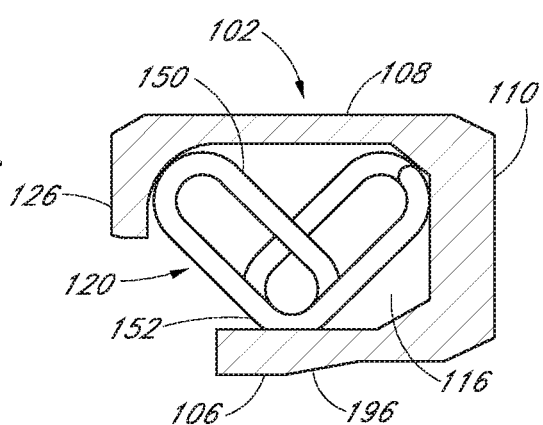
FIG. 36 shows a spring energized seal assembly comprising a sealing element with a spring groove or spring cavity having a canted coil spring located therein engaging a dimple on the sealing element.

FIG. 36 shows an alternative spring energized seal assembly 100 with similar sealing element 102 and seal body 104 as that of FIGS. 1 and 18 and with a canted coil spring with a plurality of coils 122 (only one shown) as that of FIG. 35. In the present embodiment, the inside surface 140 of the inside flange 106 is provided with a dimple 196. The dimple 196 is sized, shaped and arranged to receive a curved connecting end 152 of the coil 122 to thereby form an engagement between the coil and the seal body of the sealing element. In particular, the dimple 196 is configured to engage the coils 122 of the canted coil spring 120. The orientation and loading provided by the canted coil spring 120 of FIG. 36 to the seal body increase stability of the canted coil spring within the spring cavity of the sealing element and can prevent the canted coil spring from rolling or tilting, which can cause the loading point to be off of optimal position or reduction of the load on the seal lip. Additionally, the engagement between the dimple 196 of the inside flange 106 and the curved connecting end 152 of the coil 122 ensures optimum alignment and further resists movement of the canted coil spring within the spring cavity 116.

FIGS. 37-40 show alternative spring energized seal assemblies 270 each located inside a seal gland 220 with the inside flange 106 of the seal body 104 biased against the shaft 224 and the outside flange 108 biased against the housing 222. The seal assemblies 270 of the present embodiments may be referred to as dual seal assemblies in that each seal assembly has two back-to-back sealing elements 102 each with a seal body 104, an inside flange 106, an outside flange 108, a center channel section 110, and a spring cavity 116 and wherein the two seal bodies 104 share a single canted coil spring 120. Although only the inside flanges 106 of the two seal bodies are shown with sealing lips 132, the outside flanges 108 can also have sealing lips.

Figure 37:
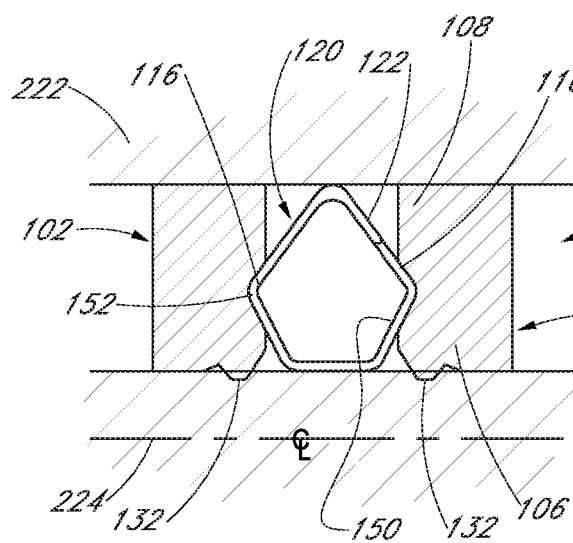
FIGS. 37-40 show alternative spring energized seal assemblies in accordance with further aspects of the invention and wherein each seal assembly has two sealing elements that are energized by a single canted coil spring.

With reference initially to FIG. 37, a canted coil spring 120 having a plurality of interconnected coils 122 (only one shown) is shown located in a spring cavity 116 of each of the two adjacent sealing elements 102. The coils 122 of the canted coil spring 120 of FIG. 37 is similar to the coils of FIG. 6 but with the straight segments 150 and curved connecting ends 152 modified. As shown, the coils have a polygonal shape, in particular a pentagon shape with five generally straight coil segments 150 connected to one another by five arcuate or curved connecting ends 152. None of the straight segments 150 of the coil is parallel with any other straight segment. One of the straight segments 150 is shown forming a line contact 145 with the shaft 224 and one of the curved or arcuate connecting ends 152 forms an extended point contact 160 with the housing 222. Two of the curved connecting ends 152 and several of the straight segments 150 can project into the two spring cavities 116 of the two back-to-back sealing elements 102 to bias the inside and outside flanges of the two sealing elements away from one another. In some examples, the coils 122 can be coiled as shown in FIG. 6 so that the straight segment forms a line contact with the housing 222 and the curved connecting end 152 forms an extended point contact with the shaft 224. Thus, the seal assembly 270 of FIG. 37 is understood to have a single canted coil spring for biasing an inside flange 106 and an outside flange 108 of each of the two spaced apart seal bodies 104 sealing element away from one another.

Figure 38:
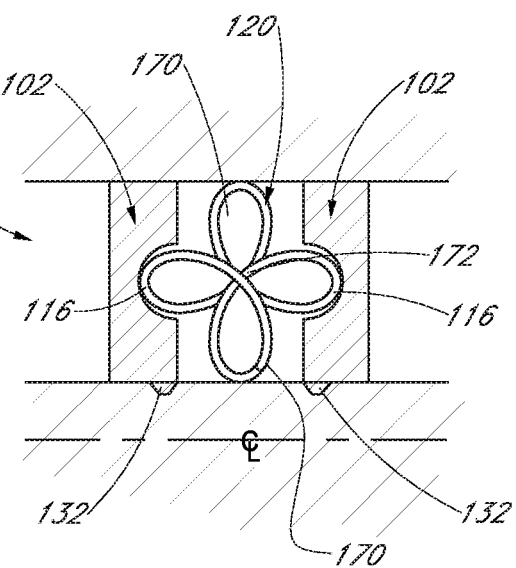

With reference to FIG. 38, a canted coil spring 120 having a plurality of interconnected coils 122 (only one shown) is shown located in a spring cavity 116 of two adjacent sealing elements 102. The coils 122 of the canted coil spring 120 of FIG. 38 are similar to the coils of FIG. 13. FIG. 38 shows a canted coil spring 120 each with a plurality of coils 122 (only one shown) and each coil with multi-loops and each coil with a geometry that resembles a four-leaf clover. Said multi-loop geometry comprises four loops 170 each with a curved connecting end 152. The loops converge at common internal point or location 172. Two of the curved connecting ends 152 of two of the loops 170 form extended point contacts 160, one with the housing 222 and one with the pin or shaft 224. Two of the remaining loops 170 project into the two spring cavities 116 of the two back-to-back sealing elements 102, one loop 170 into the spring cavity 116 of one seal body and another loop into the spring cavity of another spring cavity, to bias the inside and outside flanges 106, 108 of each of the two sealing elements 102 away from one another. Thus, the seal assembly 270 of FIG. 38 is understood to have a single canted coil spring for biasing an inside flange 106 and an outside flange 108 of each of the two spaced apart seal bodies 104 sealing element away from one another.

Figure 39:
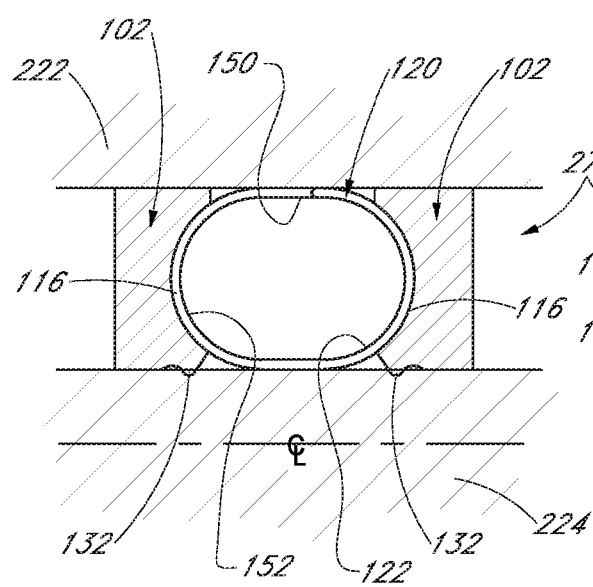

With reference to FIG. 39, a canted coil spring 120 having a plurality of interconnected coils 122 (only one shown) is shown located in a spring cavity 116 of each of two adjacent sealing elements 102. The coils 122 of the canted coil spring 120 of FIG. 39 are similar to the coils of FIG. 1. FIG. 39 shows a canted coil spring 120 each with a plurality of coils 122 (only one shown) and each coil 122 of the canted coil spring 120 having a coil shape defined by two generally parallel straight segments 150 with a curved or arcuate connecting end or segment 152 at each end joining the two generally parallel straight segments 150 together. The canted coil spring 120 is located inside the spring groove or spring cavity 116 of each of the two spaced apart sealing elements 102, in particular the two curved connecting ends 152 are located in the two spring grooves 116, to bias the inside flange 106 and the outside flange 108 of each of the seal body 104 away from one another. The two straight segments 150 of the coil form two line contacts 145, one with the housing 222 and one with the pin or shaft 224. Thus, the seal assembly 270 of FIG. 39 is understood to have a single canted coil spring for biasing an inside flange 106 and an outside flange 108 of each of the two spaced apart seal bodies 104 sealing element away from one another.

Figure 40:
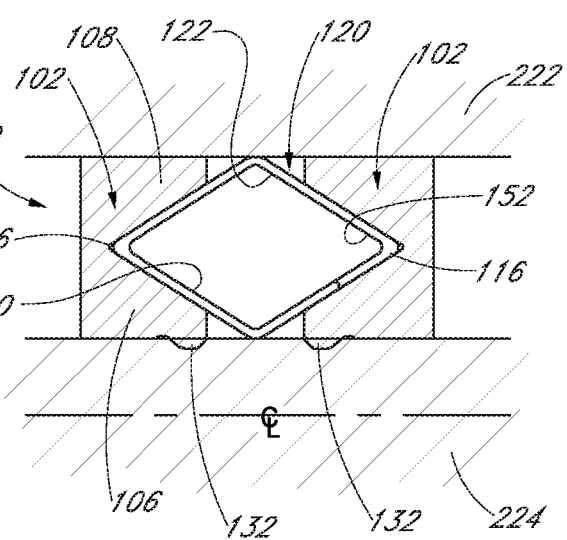

With reference to FIG. 40, a canted coil spring 120 having a plurality of interconnected coils 122 (only one shown) is shown located in a spring cavity 116 of two adjacent sealing elements 102. The coils 122 of the canted coil spring 120 of FIG. 40 are similar to the coils of FIG. 5. FIG. 40 shows a canted coil spring 120 each with a plurality of coils 122 (only one shown) and each coil 122 having a polygonal shape, in particular a rhombus shape with four generally straight coil segments 150 connected to one another by four arcuate or curved connecting ends 152. The canted coil spring 120 is located inside the spring grooves or spring cavities 116 of the two spaced apart sealing elements 102, in particular two curved connecting ends 152 with parts of four straight segments 150 located in the two spring grooves 116, to bias the inside flange 106 and the outside flange 108 of each seal body 104 away from one another. The remaining two curved connecting ends 152 form two extended point contacts 160, one with the housing 222 and one with the pin or shaft 224. Thus, the seal assembly 270 of FIG. 40 is understood to have a single canted coil spring for biasing an inside flange 106 and an outside flange 108 of each of the two spaced apart seal bodies 104 of two sealing elements 202 away from one another. In some examples, such as shown, the curved connecting ends 152 can be tight or can have small radiuses so that contacts therewith can be characterized as simply a point contact with multiple contacts referred to as multiple point contacts.

The present disclosure is further understood to include methods for making and for using any one or more of the various spring energized seal assemblies and unique canted coil springs discussed herein.

Although limited embodiments of spring energized seals and canted coil springs and their components have been specifically described and illustrated herein, many modifications and variations will be apparent to those skilled in the art. Furthermore, elements and features expressly discussed for one embodiment but not for another may equally apply provided the functionality or structures do not conflict. Thus, unless the context indicates otherwise, like features for one embodiment are applicable to another embodiment. Accordingly, it is to be understood that the seal assemblies and the canted coil springs and their components constructed according to principles of the disclosed devices, systems, and methods may be embodied other than as specifically described herein. The disclosure is also defined in the following claims.

What is claimed is:

1. A spring energized seal assembly comprising:
   a sealing member having a seal body with an annular opening, an inside flange defining the annular opening, an outside flange, a center channel section located between the inside flange and the outside flange, and a spring cavity defined by the inside flange, the outside flange, and the center channel section;
   a canted coil spring located in the spring cavity of the seal body, said canted coil spring comprising plurality of coils, at least two coils of the plurality of coils each comprising a coil width, at least one straight segment having a straight section that is at least 25% of the coil width, and wherein the at least one straight segment contacts the inside flange or the outside flange of the seal body to form a line contact with the seal body; and
   wherein each of the at least two coils comprises a curved connecting end connecting two adjacent straight segments and wherein the curved connecting ends of the at least two coils contact a surface of the other one of the inside flange or the outside flange opposite the at least one straight segment at a location spaced from the center channel section.

2. The spring energized seal assembly of claim 1, wherein the inside flange comprises an interior flange surface, said interior flange surface having a planar surface section with a length, and wherein a recess is formed between two ends of the length of the planar surface section to define a notch.

3. The spring energized seal assembly of claim 2, wherein the curved connecting ends of the at least two coils are located in the notch of the inside flange.

4. The spring energized seal assembly of claim 1, wherein each of the at least two coils comprises a dimple forming an internal loop and defining two spaced apart projections, and wherein the two spaced apart projections contact the inside flange at two spaced apart locations on the inside flange.

5. The spring energized seal assembly of claim 4, wherein the inside flange comprises a recessed area along an outer surface of the inside flange to define two sealing lips, and wherein the two spaced apart projections of the at least two coils are aligned with the two sealing lips.

6. The spring energized seal assembly of claim 1, further comprising a third and a fourth coil and wherein each of the third and four coils comprises a curved connecting end contacting the other one of the inside flange or the outside flange.

7. The spring energized seal assembly of claim 1, wherein each of the at least two coils comprises a second straight segment having a straight section that is at least 25% of the coil width.

8. The spring energized seal assembly of claim 1, wherein each of the at least two coils comprises a coil height and wherein the coil width is greater in dimension than the coil height.

9. The spring energized seal assembly of claim 1, wherein the canted coil spring is filled with an elastic non-metallic material.

10. The spring energized seal assembly of claim 1, further comprising an outer spring groove on an outside diameter of the sealing member and wherein a second canted coil spring is located in the outer spring groove.

11. The spring energized seal assembly of claim 10, for use in EMI shielding application.

12. A spring energized seal assembly comprising:
- a sealing member having a seal body with an annular opening, an inside flange defining the annular opening, an outside flange, a center channel section located between the inside flange and the outside flange, and a spring cavity defined by the inside flange, the outside flange, and the center channel section;
- a canted coil spring located in the spring cavity of the seal body, said canted coil spring comprising plurality of coils, at least two coils of the plurality of coils each comprising two or more straight segments, and wherein at least one of the straight segments contacts the inside flange or the outside flange of the seal body to form a line contact with the seal body; and
- wherein the inside flange comprises a flange surface or the outside flange comprises a flange surface, and wherein the flange surface is generally planar with a length and a notch recessed from the generally planar flange surface at a location between two ends of the generally planar flange surface.

13. The spring energized seal assembly of claim 12, wherein the notch is located on the inside flange and wherein a curved connecting end of the canted coil spring is in contact with the notch.

14. The spring energized seal assembly of claim 12, wherein the notch is located on the outside flange and wherein the canted coil spring comprises a curved connecting end located in the notch of the outside flange.

15. The spring energized seal assembly of claim 12, wherein each of the at least two coils comprises a curved connecting end and wherein the curved connecting ends of the at least two coils contact the other one of the inside flange or the outside flange.

16. The spring energized seal assembly of claim 12, wherein each of the plurality of coils comprises at least five straight segments.

17. The spring energized seal assembly of claim 12, wherein the canted coil spring is filled with an elastic non-metallic material.

18. The spring energized seal assembly of claim 12, further comprising an outer spring groove on an outside diameter of the sealing member and wherein a second canted coil spring is located in the outer spring groove.

19. The spring energized seal assembly of claim 12, for use in EMI shielding application.

20. A spring energized seal assembly comprising:
- a sealing member having a seal body with an annular opening, an inside flange defining the annular opening, an outside flange, a center channel section located between the inside flange and the outside flange, and a spring cavity defined by the inside flange, the outside flange, and the center channel section;
- a canted coil spring located in the spring cavity of the seal body, said canted coil spring comprising plurality of coils, at least two coils of the plurality of coils each comprising few-two or more straight segments;
- for each of the at least two coils, a curved connecting end connects two adjacent straight segments of the two or more straight segments;
- wherein the inside flange comprises a flange surface or the outside flange comprises a flange surface; and
- wherein the two curved connecting ends of the at least two coils are in contact with the notch.

21. The spring energized seal assembly of claim 20, wherein the two adjacent straight segments are angled to one another.

* * * * *